(12) United States Patent
Bohannon et al.

(10) Patent No.: US 11,308,568 B2
(45) Date of Patent: Apr. 19, 2022

(54) CONFINED SPACE CONFIGURATION AND OPERATIONS MANAGEMENT SYSTEM

(71) Applicant: 3M INNOVATIVE PROPERTIES COMPANY, St. Paul, MN (US)

(72) Inventors: Kandyce M. Bohannon, White Bear Lake, MN (US); Kiran S. Kanukurthy, Cottage Grove, MN (US); Lydia R. Carlson, St. Paul, MN (US); Micayla A. Johnson, Farmington, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 29 days.

(21) Appl. No.: 16/614,488

(22) PCT Filed: Jul. 30, 2018

(86) PCT No.: PCT/IB2018/055675
§ 371 (c)(1),
(2) Date: Nov. 18, 2019

(87) PCT Pub. No.: WO2019/025938
PCT Pub. Date: Feb. 7, 2019

(65) Prior Publication Data
US 2020/0160471 A1     May 21, 2020

Related U.S. Application Data

(60) Provisional application No. 62/541,365, filed on Aug. 4, 2017.

(51) Int. Cl.
*G06Q 50/26* (2012.01)
*G06Q 10/06* (2012.01)

(52) U.S. Cl.
CPC ......... *G06Q 50/265* (2013.01); *G06Q 10/067* (2013.01); *G06Q 10/06315* (2013.01)

(58) Field of Classification Search
CPC ........... G06Q 50/265; G06Q 10/06315; G06Q 10/067
(Continued)

(56) References Cited

U.S. PATENT DOCUMENTS 6,661,233 B2   12/2003   Yang
7,496,580 B2   2/2009    Hajdukiewicz
(Continued)

FOREIGN PATENT DOCUMENTS

WO   WO 2010-043870   4/2010
WO   WO 2011-059128   5/2011
(Continued)

OTHER PUBLICATIONS

Moore, Interactive PPE Keeps Workers Safer, Construction Equipment (Feb. 2017), available at www.constructionequipment.com/interactive-ppe-keeps-workers-safer (Year: 2017).*
(Continued)

*Primary Examiner* — Charles Guiliano
(74) *Attorney, Agent, or Firm* — Steven A. Bern; Christopher D. Karlen

(57) ABSTRACT

A computing system includes a computing device and a repository storing at least one model for a plurality of confined spaces each having limited means of entry or exit. The at least one model is based at least in part on respective sets of one or more characteristics of the plurality of confined spaces. The computing device is configured to: obtain one or more characteristics of a particular confined space having limited means of entry or exit, the one or more characteristics of the particular confined space identifying at least a type of the particular confined space; apply the at
(Continued)

least one model to the one or more characteristics of the particular confined space to identify at least one hazard remediation technique for the particular confined space; and output a notification indicating the at least one hazard remediation technique.

20 Claims, 9 Drawing Sheets

(58) Field of Classification Search
USPC .................................. 705/7.28, 7.25, 325
See application file for complete search history.

(56) References Cited

U.S. PATENT DOCUMENTS

| | | | |
|---|---|---|---|
| 8,718,594 B2 | 5/2014 | Braznell | |
| 9,171,305 B2 | 10/2015 | Michalscheck | |
| 2009/0234690 A1 | 9/2009 | Nikipelo | |
| 2011/0234374 A1* | 9/2011 | Insley | A41D 13/00 |
| | | | 340/10.1 |
| 2014/0108334 A1 | 4/2014 | Michalscheck | |
| 2015/0345942 A1 | 12/2015 | Allocco | |
| 2017/0185905 A1* | 6/2017 | Eberbach | G08B 21/12 |
| 2017/0188166 A1* | 6/2017 | Eberbach | G08B 21/182 |
| 2018/0012470 A1* | 1/2018 | Kritzler | G06Q 10/00 |
| 2019/0118008 A1* | 4/2019 | Thompson | A62B 9/006 |
| 2019/0333178 A1* | 10/2019 | Cheng | G06Q 10/20 |

FOREIGN PATENT DOCUMENTS

| | | |
|---|---|---|
| WO | WO 2016-176301 | 11/2016 |
| WO | WO 2017-040393 | 3/2017 |

OTHER PUBLICATIONS

International Search Report for PCT International Application No. PCT/IB2018/055675, dated Oct. 11, 2018, 5 pages.

* cited by examiner

FIG. 4

CONFINED SPACE CONFIGURATION AND OPERATIONS MANAGEMENT SYSTEM

TECHNICAL FIELD

This disclosure relates to worker safety and, more specifically, to worker safety in confined spaces.

BACKGROUND

Personal protective equipment (PPE) may be used to protect a user (e.g., a worker) from harm or injury from a variety of causes. PPE is particularly important when a worker operates in confined spaces, such as manholes, elevator shafts, storage tanks, etc. Confined spaces present number hazards, such as falling, dangerous chemicals, etc. To help ensure safety in the event of a fall, workers often wear safety harnesses connected to support structures with fall protection equipment such as lanyards, energy absorbers, self-retracting lifelines (SRLs), descenders, and the like. Similarly, when working in areas where there is known to be, or there is a potential of there being, dusts, fumes, gases or other contaminants that are potentially hazardous or harmful to health, it is typical for a worker to use a respirator or a clean air supply source. Other PPE may include, as non-limiting examples, hearing protection, head protection (e.g., visors, hard hats, or the like), protective clothing, or the like.

SUMMARY

The systems and techniques of this disclosure relate to improving worker safety in confined spaces. Confined spaces include areas with limited or restricted means of entry and/or exit, and which are not designed for continuous occupancy by humans. Examples of confined spaces include tanks, vessels, silos, vaults, pits, manholes, tunnels, ductwork, shafts, etc. A given location may have numerous (tens, hundreds, even thousands) of confined spaces. According to systems and techniques of this disclosure, a computing system may include a model configured to predict hazards that are likely to be present in a particular confined space and recommend procedures to reduce the risk posed by the predicted hazards. The computing system may be configured to monitor the confined space and perform actions based on the conditions of the worker and/or confined space. The computing system may update the model based on the conditions of the worker and/or confined space. Thus, the techniques of this disclosure may increase worker safety when working in confined spaces.

In one example, the disclosure describes a computing system that includes a computing device and a repository storing at least one model for a plurality of confined spaces each having limited means of entry and/or exit. The at least one model is based at least in part on respective sets of one or more characteristics of the plurality of confined spaces. The computing device is configured to: obtain one or more characteristics of a particular confined space having limited means of entry or exit, the one or more characteristics of the particular confined space identifying at least a type of the particular confined space; apply the at least one model to the one or more characteristics of the particular confined space to identify at least one hazard remediation technique for the particular confined space; and output a notification indicating the at least one hazard remediation technique.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 illustrates an example user interface for monitoring hazard remediation techniques applied by an article of PPE, according to aspects of this disclosure.

DETAILED DESCRIPTION

Figure 1:
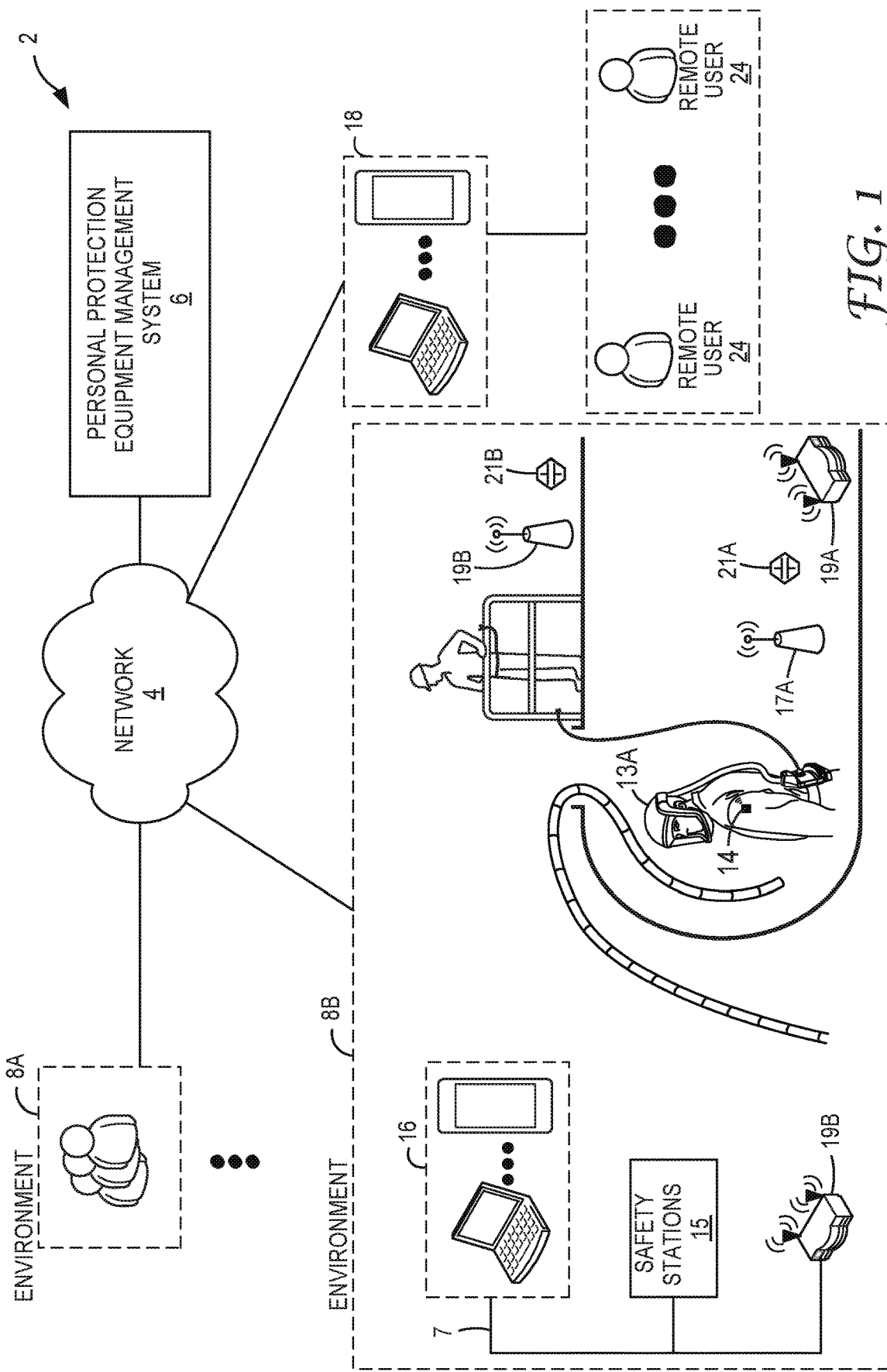
FIG. 1 is a block diagram illustrating an example worker protection system, in accordance with various techniques of this disclosure.

FIG. 1 is a block diagram illustrating an example worker protection system 2. In some examples, worker protection system 2 that includes a plurality physical environments 8A, 8B (collectively, environments 8) with devices that are communicatively coupled to a confined space management system (CSMS) 6. Worker protection system 2 may also include one or more computing devices 18 utilized by one or more remote users 24 that may monitor environments 8.

Each of environments 8 represents a physical environment, such as a work environment, in which one or more individuals engage in tasks or activities within the respective environment and may utilize personal protection equipment. In the example of FIG. 1, environment 8A is shown as generally while environment 8B is shown in expanded form to provide a more detailed example.

One or more of environments 8 may include at least one confined space. Confined spaces may include areas with limited or restricted means of entry and/or exit. In some examples, confined spaces may not be designed for continuous occupancy by humans. Confined spaces may hold liquids, gases, or other substances that may be hazardous to the health of a human. Confined spaces may require specialized ventilation and evacuation systems for facilitating a temporarily habitable work environment. In some examples, a confined space may have particularized boundaries delineating a volume, region, or area defined by physical characteristics such as walls, shafts, chambers, doors, entry points, or any other physical delineations. In some examples, a confined space may have particularized hazards, which may require particularized PPE. In some examples, a confined space may have particularized hazards, which may require particularized permitting for human entry.

As illustrated in the example of FIG. 1, environment 8B includes confined space 30, which may represent a tank (e.g., a fuel or petroleum tank, chemical tank, a septic tank, etc.). Other examples of confined spaces include vessels, silos, vaults, pits, manholes, tunnels, ductwork, shafts, etc.

In the example of FIG. 1, environment 8B includes workers 10A and 10B (collectively, workers 10). Workers 10 are shown as utilizing various articles of personal protective equipment (PPE). For instance, in the example of FIG. 1, worker 10A is located within confined space 30 and is utilizing a respirator 13 and extraction equipment 23 (e.g., which may include clips, harness, rope, etc.). As further illustrated in FIG. 1, worker 10B is located outside the confined space and is utilizing head protection (e.g., a helmet) 22 and a self-retracting lifeline (SRL) 11 attached to safety support structure 12. As described in greater detail herein, in other examples, workers 10 may utilize a variety of other PPE that are compatible with the techniques described herein, such as hearing protection, eye protection, safety clothing, fall protection, or the like.

One or more articles of PPE utilized by workers 10 may include embedded sensors or monitoring devices and processing electronics configured to capture data in real-time as a user (e.g., worker) engages in activities while wearing the fall protection equipment. For example, one or more of SRL 11, respirator 13, or head protection 22 may include a variety of electronic sensors such as one or more of an accelerometer, a location sensor, an altimeter, one or more environment sensors, and/or other sensors for measuring operations of the respective articles of PPE. The one or more articles of PPE may include one or more output devices for outputting data that is indicative of operation of the particular article of PPE and/or generating and outputting communications to the respective worker 10. For example, one or more of SRL 11, respirator 13, or head protection 22 may include may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

Respirator 13 may also include a number of components (e.g., a head top, a blower, a filter, and the like). Respirators 13 may include a number of sensors for sensing or controlling the operation of such components. A head top may include, as examples, a head top visor position sensor, a head top temperature sensor, a head top motion sensor, a head top impact detection sensor, a head top position sensor, a head top battery level sensor, a head top head detection sensor, an ambient noise sensor, or the like. A blower may include, as examples, a blower state sensor, a blower pressure sensor, a blower run time sensor, a blower temperature sensor, a blower battery sensor, a blower motion sensor, a blower impact detection sensor, a blower position sensor, or the like. A filter may include, as examples, a filter presence sensor, a filter type sensor, or the like. Each of the above-noted sensors may generate usage data. While FIG. 1 is described with respect to SRL 11, respirator 13, and head protection 22, the techniques of this disclosure may also be applied to a variety of other PPE.

In general, each of environments 8 include computing and/or networking facilities (e.g., a local area network) by which SRL 11, respirator 13, head protection 22, and/or other articles of PPE communicate with CSMS 6. For examples, environments 8 may be configured with wireless technology, such as 602.11 wireless networks, 602.15 Zig-Bee networks, and the like. In the example of FIG. 1, environment 8B includes a local network 7 that provides a packet-based transport medium for communicating with CSMS 6 via network 4. In addition, environment 8B includes a plurality of wireless access points 19A, 19B that may be geographically distributed throughout the environment to provide support for wireless communications throughout the work environment.

Each of SRL 11, respirator 13, head protection 22, and/or other articles of PPE may be configured to communicate data, such as sensed motions, events and conditions, via wireless communications, such as via 602.11 WiFi protocols, Bluetooth protocol or the like. SRL 11, respirator 13, and head protection 22 may, for example, communicate directly with a wireless access point 19. As another example, each worker 10 may be equipped with a corresponding one of wearable communication hubs 14A-14B (collectively, hubs 14) that enable and facilitate communication between SRL 11, respirator 13, head protection 22 (and/or any other articles of PPE) and CSMS 6. For examples, PPE utilized by worker 10A may communicate with a respective communication hub 14 via Bluetooth or other short range protocol, and the communication hubs may communicate with CSMS 6 via wireless communications processed by wireless access points 19. Although shown as wearable devices, hubs 14 may be implemented as standalone devices deployed within environment 8B.

In general, each of hubs 14 operates as a wireless device for SRL 11, respirator 13, head protection 22 and/or other PPE relaying communications to and from the PPE, and may be capable of buffering usage data in case communication is lost with CSMS 6. Moreover, each of hubs 14 is programmable via CSMS 6 so that local alert rules may be installed and executed without requiring a connection to the cloud. As such, each of hubs 14 provides a relay of streams or sets of usage data from SRL 11, respirator 13, head protection 22, and/or other PPEs within the respective environment, and provides a local computing environment for localized alerting based on streams of events in the event communication with CSMS 6 is lost.

As shown in the example of FIG. 1, an environment, such as environment 8B, may also include one or more wireless-enabled beacons, such as beacons 17A and 17B (collectively, beacons 17), that provide accurate location information within the work environment. For example, beacons 17 may be GPS-enabled such that a controller within the respective beacon may be able to precisely determine the position of the respective beacon. Based on wireless communications with one or more of beacons 17, a given article of PPE or communication hub 14 worn by a worker 10 may be configured to determine the location of the worker within work environment 8B. In this way, event data reported to CSMS 6 may be stamped with positional information to aid analysis, reporting and analytics performed by the CSMS.

In addition, an environment, such as environment 8B, may also one or more wireless-enabled sensing stations, such as sensing stations 21A and 21B (collectively, sensing stations 21). Each sensing station 21 may include one or more sensors and a controller configured to output data indicative of sensed environmental conditions. Example environmental conditions that may be sensed by sensing devices 21 include but are not limited to temperature, humidity, presence of gas, pressure, visibility, wind and the like. Moreover, sensing stations 21 may be positioned within respective geographic regions of environment 8B or otherwise interact with beacons 17 to determine respective positions and include such positional information when reporting environmental data to CSMS 6. As such, CSMS 6 may configured to correlate the senses environmental conditions with the particular regions and, therefore, may utilize the captured environmental data when processing event data received from SRL 11, respirator 13, head protection 22, or other PPE. For example, CSMS 6 may utilize the environmental data to aid generating alerts or other instructions for PPE and for performing predictive analytics, such as determining any correlations between certain environmental conditions (e.g., heat, humidity, visibility) with abnormal worker behavior or increased safety events. As such, CSMS 6 may utilize current environmental conditions to aid prediction and avoidance of imminent safety events.

In example implementations, an environment, such as environment 8B, may also include one or more safety stations 15 distributed throughout the environment to provide viewing stations for accessing CSMS 6. Safety stations 15 may allow one of workers 10 to check out SRLs 11, respirators 13 and/or other safety equipment, verify that safety equipment is appropriate for a particular one of environments 8, and/or exchange data. For example, safety stations 15 may transmit alert rules, software updates, or firmware updates to SRL 11, respirator 13, head protection 22, or other equipment. Safety stations 15 may also receive data cached on SRL 11, respirator 13, head protection 22, hubs 14, and/or other safety equipment. That is, while SRL 11, respirator 13, head protection 22, and/or hubs 14 may typically transmit usage data to network 4, in some instances, SRL 11, respirator 13, head protection 22, and/or hubs 14 may not have connectivity to network 4. In such instances, SRL 11, respirator 13, head protection 22, and/or hubs 14 may store usage data locally and transmit the usage data to safety stations 15 upon being in proximity with safety stations 15. Safety stations 15 may then upload the data from the equipment and connect to network 4.

In addition, each of environments 8 include computing facilities that provide an operating environment for end-user computing devices 16 for interacting with CSMS 6 via network 4. For example, workers 10 may interact with computing devices 16 to access CSMS 6. Similarly, remote users 24 may use computing devices 18 to interact with CSMS via network 4. For purposes of example, the end-user computing devices 16, 18 may include laptops, desktop computers, mobile devices such as tablets or so-called smart phones and the like.

In general, CSMS 6 provides data acquisition, monitoring, activity logging, reporting, predictive analytics, and alert generation. CSMS 6 may provide an integrated suite of personal safety protection equipment management tools and may implement various techniques of this disclosure. That is, CSMS 6 provides an integrated, end-to-end system for managing personal protection equipment, e.g., safety equipment, used by workers 10 within one or more physical environments 8, such confined space 30 within environment 8B.

Further, as described herein, CSMS 6 processes thousands or even millions of concurrent streams of events from digitally enabled PPEs (e.g., SRL 11, respirator 13, and/or head protection 22), beacons 17, and/or sensing stations 21. CSMS 6 may apply historical data and models to the inbound streams to compute assertions, such as identified anomalies or predicted occurrences of safety events based on conditions or behavior patterns of workers 10. Further, CSMS 6 provides real-time alerting and reporting to notify workers 10 and/or remote users 24 of any predicted events, anomalies, trends, and the like.

In accordance with techniques of this disclosure, CSMS 6 may perform predictive analytics to mitigate risks to workers 10 prior to workers 10 entering a confined space and to increase the safety of workers 10 within a confined space. In general, CSMS 6 may receive an indication of a confined space, determine one or more hazards associated with the confined space, and determine one or more remediation techniques for the confined space (e.g., prior to a worker entering the confined space and/or while a worker is in the confined space). For instance, CSMS 6 may obtain information for a plurality of confined spaces, and may recommend one or remediation techniques for a given confined space based on the type of confined space, a task to be completed within the confined space, hazards that may be present within the confined space, etc.

CSMS 6 may obtain information about one or more characteristics of a particular confined space (e.g., confined space 30). The characteristics of confined space 30 may include a type (e.g., tank, vessel, silo, vault, pit, manholes, tunnel, ductwork, shaft) of confined space 30, a size of a confined space 30, a location of a confined space 30, one or more hazards associated with confined space 30, etc. In some scenarios, CSMS 6 may obtain the information indicative of the characteristics of confined space 30 during setup of a work configuration prior to one or more of workers 10 entering confined space 30. A work configuration may include information associated with a task (e.g., cleaning, repair, etc.) to be performed within confined space 30, such as the task itself, the characteristics of confined space 30, potential hazards present in confined space 30, and/or equipment (e.g., one or more articles of PPE) for completing the task. In some instances, a user (e.g., one of workers 10 or remote users 24) may enter a proposed work configuration prior to entering confined space 30. In some scenarios, CSMS 6 may obtain the characteristics of confined space 30 while one or more workers 10 are performing the task within confined space 30. In other words, CSMS 6 may obtain information about the characteristics of confined space 30 when a user sets up a work configuration prior to entering confined space 30, while one or more of workers 10 are in confined space 30, or both.

In some examples, CSMS 6 may obtain one or more characteristics of a confined space during setup of a new confined space. For example, CSMS 6 may receive a user input indicative of a new confined space (e.g., a confined space not previously catalogued in CSMS 6) and one or more characteristics of the new confined space. For example, CSMS 6 may receive a user input setting up a proposed work configuration that indicates confined space 30 is a new confined space (e.g., a confined space not already included in CSMS 6) and that the type of confined space is defined as a "tank".

In some instances, CSMS 6 may include information about confined space 30 and may receive information updating one or more characteristics of confined space 30. For instance, CSMS 6 receive a user input updating one or more characteristics of confined space 30, such as the type of confined space 30, a size of confined space 30, a location of confined space 30, one or more hazards for confined space 30, a type of the task to be performed, a description of the confined space 30 entrance/exit, permits required/obtained, the amount of time that worker(s) are intending to spend within the confined space 30, a number of workers, identifications of the workers, a description of workers' training, and so forth.

CSMS 6 may obtain one or more characteristics of a particular confined space from one or more sensing stations 21. For example, CSMS 6 may include information about confined space 30 and may receive additional information about the characteristics of confined space 30 from sensing station 21A. For instance, sensing station 21A may detect air quality, temperature, or other characteristics of confined space 30 and may send information indicative of the characteristics of confined space 30 to CSMS 6.

CSMS 6 may obtain information indicative of one or more characteristics of a confined space from a memory device of CSMS 6. For example, CSMS 6 may receive a user input indicating that worker 10A will be performing a task within confined space 30 and, in response, CSMS 6 may retrieve information about the characteristics of confined space 30 from the memory device. For instance, CSMS 6 may retrieve information about one or more characteristics of confined space 30 from a memory device in response to receiving a proposed work configuration indicating confined space 30 as the confined space to be worked in.

CSMS 6 may determine one or more hazards associated with a particular confined space based on one or more rules. Examples of hazards include falling, fire, air contamination, temperature, radiation, to name only a few. In some instances, the rules may be preprogrammed. In some examples, CSMS 6 includes a default group of hazards for each type of confined space. For example, CSMS 6 may include information indicating that the hazards associated with a tank include extreme temperatures, air contamination, etc. In these examples, CSMS 6 may include information indicating that confined space 30 is a tank, and may thus determine one or more hazards associated with confined space 30 by retrieving (e.g., from a lookup table) the default group of hazards associated with tanks.

CSMS 6 may include information that associates a particular confined space with a customized, particular group of hazards. In other words, in some examples, CSMS 6 includes information about one or more hazards associated with a given confined space. For example, CSMS 6 may include information that indicates one or more hazards known to exist within confined space 30, one or more hazards that may exist within confined space 30, a probability of a hazard occurring within confined space 30, etc.

In some examples, CSMS 6 may determine the one or more hazards associated with confined space 30 using at least one model trained using machine learning (e.g., k-means clustering, SVM clustering, or other machine learning techniques). In some examples, the at least one model is trained using characteristics for a plurality of confined spaces, hazards, remediation techniques, or any combination therein. For example, CSMS 6 may apply a model that is based at least in part on a plurality of confined spaces and associated hazards to the one or more characteristics of confined space 30. CSMS 6 may apply the model by evaluating one or more characteristics of a confined space using the model. In other words, the model may receive one or more characteristics of confined space 30 as inputs and may output one or more hazards associated with confined space 30 and/or hazard remediation techniques for confined space 30 operations.

CSMS 6 may determine one or more hazard remediation techniques associated with one or more confined spaces based on one or more rules. Examples of remediation techniques may include exiting (or refraining from entering) a confined space, utilizing one or more articles of hazard remediation equipment or any other techniques and/or equipment that may reduce the risk of injury to one of workers 10 while working in or around confined space 30. Hazard remediation equipment may include PPE (e.g., SRL 11, respirator 13, head protection 22, etc.) and/or non-PPE equipment (e.g., fans or other ventilation equipment, lighting, sensors, gates, fences, signage, etc.).

As described above, the one or more rules may be preprogrammed or may be generated by at least one model using machine learning. In some instances, the rules may be based on regulations (e.g., company, industry, and/or government regulations). The at least one model may receive one or more characteristics of confined space 30 as inputs and may output one or more hazard remediation techniques associated with confined space 30. Thus, CSMS 6 may apply the model to the one or more characteristics of confined space 30 to identify one or more hazard remediation techniques for confined space 30.

CSMS 6 may output a notification indicating the at least one hazard remediation technique. CSMS 6 may output the notification prior to one of workers 10 entering confined space 30 (e.g., in response to receiving a proposed work configuration) or while one or more of workers 10 is performing a task within confined space 30.

In some examples, the hazard remediation technique may include worker 10A utilizing a type of hazard remediation equipment (e.g., respirator 13). The hazard remediation technique may include utilizing a particular article of hazard remediation equipment from a plurality of hazard remediation equipment of the same type. For instance, CSMS 6 may determine that worker 10A should wear a respirator while working in confined space 30, and may identify a specific respirator 13 (e.g., one with a filter having enough remaining resources to last the duration of the task to be performed in confined space 30). CSMS 6 may output the notification to one or more of computing devices 16, computing devices 18, and/or communication hub 14. Workers 10 may receive the notification from CSMS 6 and may select one or more articles of PPE or other equipment (e.g., batteries, fans, etc.) recommended by CSMS 6 for use while performing the task within confined space 30.

CSMS 6 may receive information from a hazard sensor within confined space 30 (e.g., sensing station 21A, hub 14) and may determine one or more remediation techniques based on the information from the hazard sensor. For instance, CSMS 6 may receive an indication of a hazard (e.g., hazardous air quality) within confined space 30 while worker 10A is working in confined space 30. In some examples, CSMS 6 may determine one or more remediation techniques to be applied by an article of PPE (e.g., SRL 11, respirator 13, head protection 22, etc.) based on the indication of the hazard in confined space 30 and the characteristics of the confined space. For example, CSMS 6 may apply the hazard remediation model to the one or more characteristics of confined space 30 and the hazard indicated by sensing station 21A to determine the hazard remediation technique to be applied by respirator 13. For instance, when the sensing station 21A indicates confined space 30 includes elevated levels of a dangerous chemical in the air, CSMS 6 may determine that the hazard remediation technique includes closing a face-mask on PPE 13 or increasing the rate at which respirator 13 delivers oxygen to worker 10A. As another example, if the hazard sensor indicates an elevated air temperature within confined space 30, CSMS 6 may determine that the hazard remediation technique includes activating a cooling system of respirator 13.

In some examples, an article of PPE may receive the notification from CSMS 6 and may apply the hazard remediation technique indicated by the notification. For example, respirator 13 may receive a notification indicating that respirator 13 should increase the flow of oxygen to worker 10A and thus, respirator 13 may increase the flow of oxygen to worker 10A.

According to aspects of this disclosure, CSMS 6 may determine one or more hazard remediation techniques associated with a particular confined space. CSMS 6 may determine the hazard remediation techniques prior to a worker entering a confined space and/or while a worker performs a task within the confined space. Determining the hazard remediation techniques may enable a worker to select articles of PPE or other remediation techniques that may improve worker safety. Further, CSMS 6 may determine a hazard remediation technique to be applied by an article of PPE and may cause the article of PPE to automatically apply the hazard remediation technique, which may increase the safety of a worker while performing a task in a confined space.

In this way, CSMS 6 may provide users an end to end solution for managing confined space. CSMS 6 may include a searchable confined space inventory, hazard analysis based on the space and the job (also referred to as a task) to be done, processes to follow to prepare for and during the confined space entry, permit creation, and data analytics based on the events that occurred. Based on the hazards that are identified and the job to be done, CSMS 6 may offer PPE suggestions and/or other hazard remediation techniques.

Figure 2:
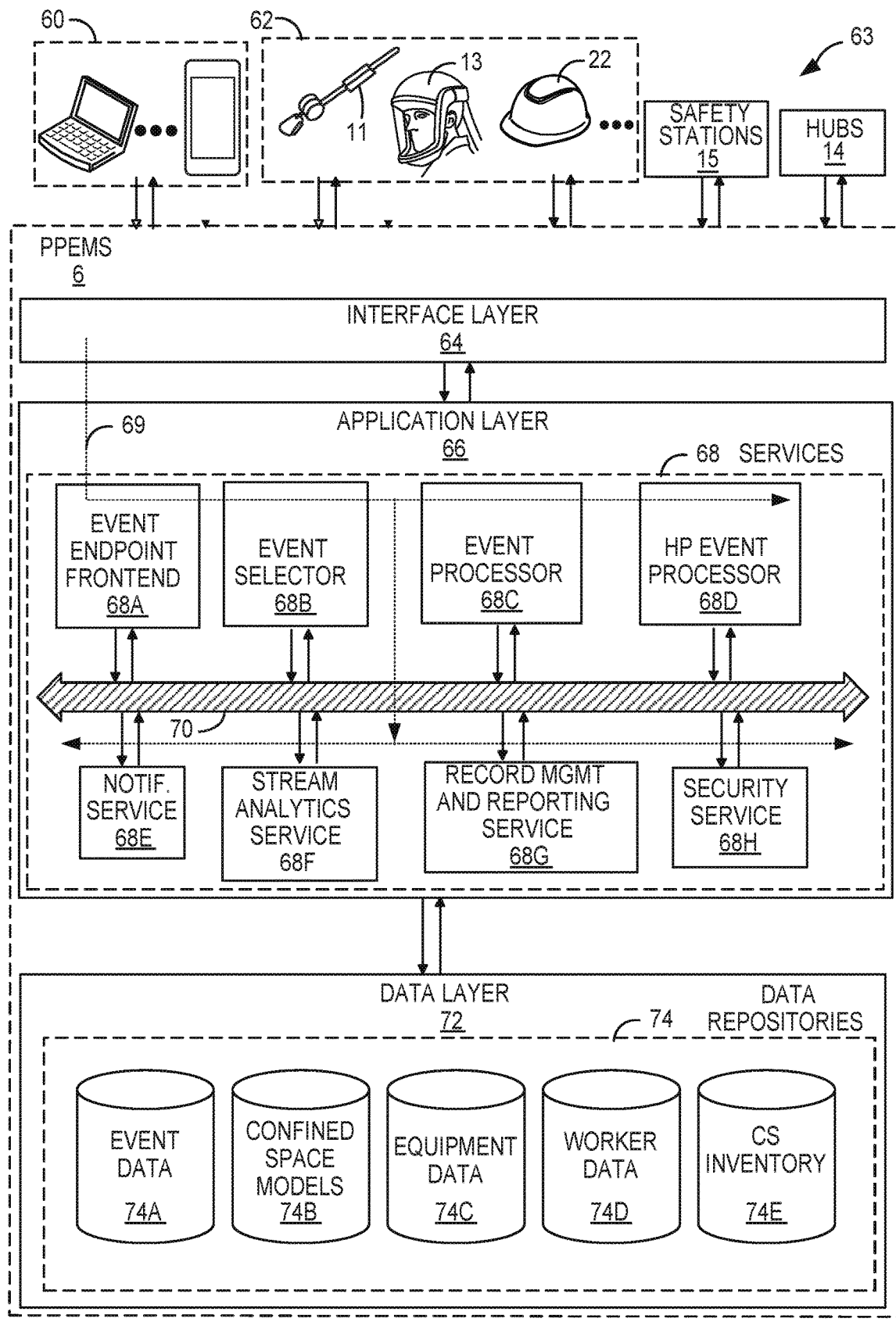
FIG. 2 is a block diagram illustrating an operating perspective of the worker protection equipment management system shown in FIG. 1.

FIG. 2 is a block diagram providing an operating perspective of CSMS 6 when hosted as cloud-based platform capable of supporting multiple, distinct work environments 8 having an overall population of workers 10 that have a variety of communication enabled personal protection equipment (PPE), such as safety release lines (SRLs) 11, respirators 13, safety helmets or other safety equipment. In the example of FIG. 2, the components of CSMS 6 are arranged according to multiple logical layers that implement the techniques of the disclosure. Each layer may be implemented by one or more modules comprised of hardware, software, or a combination of hardware and software.

In FIG. 2, personal protection equipment (PPE) 62, such as SRLs 11, respirators 13 and/or other equipment, either directly or by way of HUBs 14, as well as computing devices 60, operate as clients 63 that communicate with CSMS 6 via interface layer 64. Computing devices 60 typically execute client software applications, such as desktop applications, mobile application, and web applications. Computing devices 60 may represent any of computing devices 16, 18 of FIG. 1. Examples of computing devices 60 may include, but are not limited to a portable or mobile computing device (e.g., smartphone, wearable computing device, tablet), laptop computers, desktop computers, smart television platforms, and servers, to name only a few examples.

As further described in this disclosure, PPE 62 communicate with CSMS 6 (directly or via hubs 14) to provide streams of data acquired from embedded sensors and other monitoring circuitry and receive from CSMS 6 alerts, configuration and other communications. Client applications executing on computing devices 60 may communicate with CSMS 6 to send and receive information that is retrieved, stored, generated, and/or otherwise processed by services 68A-68H ("services 68"). For instance, the client applications may request and edit safety event information including analytical data stored at and/or managed by CSMS 6. In some examples, client applications 61 may request and display aggregate safety event information that summarizes or otherwise aggregates numerous individual instances of safety events and corresponding data acquired from PPE 62 and or generated by CSMS 6. The client applications may interact with CSMS 6 to query for analytics information about past and predicted safety events, behavior trends of workers 10, to name only a few examples. In some examples, the client applications may output for display information received from CSMS 6 to visualize such information for users of clients 63. As further illustrated and described in below, CSMS 6 may provide information to the client applications, which the client applications output for display in user interfaces.

Clients applications executing on computing devices 60 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from CSMS 6. In the example of a web application, CSMS 6 may receive requests from the web application (e.g., the web browser), process the requests, and send one or more responses back to the web application. In this way, the collection of web pages, the client-side processing web application, and the server-side processing performed by CSMS 6 collectively provides the functionality to perform techniques of this disclosure. In this way, client applications use various services of CSMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, CSMS 6 includes an interface layer 64 that represents a set of application programming interfaces (API) or protocol interface presented and supported by CSMS 6. Interface layer 64 initially receives messages from any of clients 63 for further processing at CSMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward information from the requests to services 68, and provide one or more responses, based on information received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of CSMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the information to application layer 66, which includes services 68.

As shown in FIG. 2, CSMS 6 also includes an application layer 66 that represents a collection of services for implementing much of the underlying operations of CSMS 6. Application layer 66 receives information included in requests received from client applications 61 and further processes the information according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents a logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate information to one another. As another example, services 68 may communicate in point-to-point fashion using sockets or other communication mechanism. In still other examples, a pipeline system architecture could be used to enforce a workflow and logical processing of data a messages as they are process by the software system services. Before describing the functionality of each of services 68, the layers is briefly described herein.

Data layer 72 of CSMS 6 represents a data repository that provides persistence for information in CSMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage information in data repositories 74. The RDBMS software may manage one or more data repositories 74, which may be accessed using Structured Query Language (SQL). Information in the one or more databases may be stored, retrieved, and modified using the RDBMS software. In some examples, data layer 72 may be implemented using an Object Database Management System (ODBMS), Online Analytical Processing (OLAP) database or other suitable data management system.

Confined space inventory 74E includes information associated with one or more confined spaces. For instance, confined space inventory 74E may include a unique identifier for each respective confined space and metadata describing each respective confined space. The metadata may include data describing a location of each confined space, type of confined space (e.g. vault, manhole, furnace, etc), whether a permit is required, risk level, each time the space was entered, hazards that exist in the space, etc.

As shown in FIG. 2, each of services 68 is implemented in a modular form within CSMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors.

In some examples, one or more of services 68 may each provide one or more interfaces that are exposed through interface layer 64. Accordingly, client applications of computing devices 60 may call one or more interfaces of one or more of services 68 to perform techniques of this disclosure.

Services 68 may include an event processing platform including an event endpoint frontend 68A, event selector 68B, event processor 68C, and high priority (HP) event processor 68D. Event endpoint frontend 68A operates as a front-end interface for receiving from, and sending communications to, PPE 62, hubs 14, and sensing stations 21. In other words, event endpoint frontend 68A operates to as a front-line interface to safety equipment deployed within environments 8 and utilized by workers 10. In some instances, event endpoint frontend 68A may be implemented as a plurality of tasks or jobs spawned to receive individual inbound communications of event streams 69 from the PPE 62 carrying data sensed and captured by the safety equipment. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and the PPEs may be real-time or pseudo real-time depending on communication delays and continuity.

Event selector 68B operates on the stream of events 69 received from PPE 62 and/or hubs 14 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, use of incorrect filters and/or respirators based on geographic locations and conditions, failure to properly secure SRLs 11 and the like. Responsive to processing high priority events, HP event processor 68D may immediately invoke notification service 68E to generate alerts, instructions, warnings or other similar messages to be output to SRLs 11, hubs 14 and/or remote users 20, 24. Events not classified as high priority are consumed and processed by event processor 68C.

In general, event processor 68C or high priority (HP) event processor 68D operate on the incoming streams of events to update event data 74A within data repositories 74. In general, event data 74A may include all or a subset of usage data obtained from PPE 62. For example, in some instances, event data 74A may include entire streams of samples of data obtained from electronic sensors of PPE 62. In other instances, event data 74A may include a subset of such data, e.g., associated with a particular time period or activity of PPE 62. Event processors 68C, 68D may create, read, update, and delete event information stored in event data 74A. Event information for may be stored in a respective database record as a structure that includes name/value pairs of information, such as data tables specified in row/column format. For instance, a name (e.g., column) may be "worker ID" and a value may be an employee identification number. An event record may include information such as, but not limited to: worker identification, PPE identification, acquisition timestamp(s) and data indicative of one or more sensed parameters.

Record management and reporting service 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, individual or groups/types of PPE 62. In response, record management and reporting service 68G accesses event information based on the request. Upon retrieving the event data, record management and reporting service 68G constructs an output response to the client application that initially requested the information. In some examples, the data may be included in a document, such as an HTML document, or the data may be encoded in a JSON format or presented by a dashboard application executing on the requesting client computing device. For instance, as further described in this disclosure, example user interfaces that include the event information are depicted in the figures.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the PPE event information over the period of time.

In accordance with techniques of this disclosure, confined space configuration service 68H may perform predictive analytics to mitigate risks to workers 10 prior to workers 10 entering a confined space (e.g., confined space 30 of FIG. 1). In general, confined space configuration service 68H may receive an indication of a confined space, determine one or more hazards associated with the confined space, and determine one or more remediation techniques for the confined space (e.g., prior to a worker entering the confined space).

Confined space configuration service 68H may obtain information about one or more characteristics of a particular confined space (e.g., confined space 30). In some examples, during setup of a work configuration, confined space configuration service 68H may receive an indication of a user input (e.g., via computing devices 60) describing or otherwise indicating a confined space in which workers 10 will perform a task. In other words, a user of one of computing devices 60 may set up a proposed work configuration by identifying at least a confined space (e.g., confined space 30 of FIG. 1) in which one or more workers 10 will perform a task (e.g., cleaning, repair, etc.). Confined space 30 may be a new confined space or an existing confined space.

In some instances, confined space configuration service 68H may receive an indication that the confined space 30 is a new confined space. In such instances, confined space configuration service 68H may assign a unique identifier to new confined space 30. In some examples, confined space configuration service 68H may receive an indication that confined space 30 is an existing confined space. For instance, the information may include the name, location, unique identifier, or other identifying information of the confined space where a task will be performed.

Confined space configuration service 68H may obtain indications of one or more characteristics of confined space 30. Examples of the characteristics of confined space 30 include a type, a location, or dimensions of confined space 30, hazards associated with confined space 30, etc. Confined space 30 may obtain information about the characteristics of confined space 30 from a user input at one of computing device 60 or clients 63 or sensor information from any of PPE 62, clients 63, or sensing stations 21. In some examples, confined space configuration service 68H may receive an indication of the type of confined space 30. For example, confined space configuration service 68H may receive information from a user (e.g., when a user sets up a proposed work configuration for a new confined space) identifying the confined space (e.g., confined space 30) and the type (e.g., tank, manhole, etc.) of the new confined space. As another example, confined space configuration service 68H may receive information from a user (e.g., when a user sets up a proposed work configuration for an existing confined space) identifying an existing confined space and may query confined space models 74B for the type of the confined space. For instance, the proposed work configuration may indicate that a task is to be performed in confined space 30, and confined space configuration service 68H may query confined space models 74B to determine the type of confined space 30. In some examples, the proposed work configuration received by confined space configuration service 68H may also indicate a task (e.g., cleaning, repair, etc.) to be performed within confined space 30, one or more characteristics of confined space 30, and/or remediation techniques (e.g., one or more articles of PPE). In some examples, the proposed work configuration may also indicate one or more hazards associated with confined space and/or one or more hazard remediation techniques. For instance, confined space configuration service 68H may receive an indication of the hazards and/or hazard remediation techniques associated with confined space 30 in response to a user entering such information (e.g., via one of computing devices 60).

In general, confined space configuration service 68H may determine one or more hazard remediation techniques prior to workers 10 performing a task within confined space 30. Confined space configuration service 68H may determine the one or more hazard remediation techniques based on one or more confined space models 74B. Confined space models 74B may include separate models for a particular confined space, a particular type of confined space, a particular type of hazard, etc. Confined space models 74B may include a group of rules, which may be preprogrammed or may be trained using machine learning. Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

In some examples, confined space configuration service 68H may apply at least one model of confined space models 74B to the one or more characteristics of the particular confined space to identify at least one hazard remediation technique for the particular confined space. For example, confined space configuration service 68H may compare one or more characteristics of confined space comprises 30 to a group of characteristics for respective confined spaces of a plurality of other confined spaces in order to determine the at least one hazard remediation technique for confined space 30. For instance, one characteristic of confined space 30 may be the hazards associated with confined space 30, such that confined space configuration service 68H may apply at least one of confined space models 74B to the hazards of confined space 30 to determine one or more remediation techniques for confined space 30.

In some examples, confined space configuration service 68H may determine one or more hazards associated with confined space 30 based on a user input. For example, computing device 60 may receive a user input indicating confined space 30 as a workspace and one or more hazards associated with (e.g., known to be present) in confined space 30. In some instances, confined space configuration service 68H may apply at least one model of confined space models 74B to determine one or more hazards associated with confined space 30 and determine one or more remediation techniques to mitigate the risk posed by the one or more hazards.

Confined space configuration service 68H may determine one or more hazards associated with confined space 30 based at least in part on the type of confined space 30. For example, confined space configuration service 68H may apply at least one model of confined space models 74 to the one or more characteristics of the confined space 30 to identify one or more of the plurality of confined spaces that are the same type as confined space 30. For example, in examples where confined space 30 is a tank, confined space configuration service 68H may apply one or more of confined space models 74B to identify other confined spaces that are also tanks. Confined space configuration service 68H may determine one or more hazards associate with confined space 30 based on one or more confined spaces that are the same type as confined space 30. For instance, responsive to identifying other confined spaces that are of the same type as confined space 30 (e.g., tanks), confined space configuration service 68H may determine that confined space 30 is associated with one or more hazards as similar types of confined spaces. In other words, confined space configuration service 68H may determine that confined space 30 is associated with the one or more of the same hazards as other confined spaces that are also tanks.

In some examples, confined space configuration service 68H may apply one or more confined space models 74B to one or more characteristics of confined space 30 to identify at least one additional hazard not previously associated with confined space 30. For example, confined space configuration service 68H may compare the hazards associated with confined space 30 to hazards associated with a plurality of other confined spaces. Confined space configuration service 68H may determine that confined space 30 is associated with a first hazard (e.g., a first type of gas) and may identify other confined spaces that are also associated with the first hazard. In other words, confined space configuration service 68H may apply one or more of confined space models 74B to a first hazard associated with confined space 30 and may correlate the first hazard with a second hazard not previously associated with confined space 30. Responsive to identifying a plurality of confined spaces that are associated with the first hazard, confined space configuration service 68H may identify a second hazard associated with at least some of the plurality of confined spaces. For instance, confined space configuration service 68H may determine when a confined space is associated with a first type of gas, the confined space is often associated with a second type of gas hazard as well. Thus, in such instances, confined space configuration service 68H may identify the second type of gas as another hazard associated with confined space 30.

Confined space configuration service 68H may identify, based on a first hazard associated with confined space 30 and a second hazard associated with the confined space 30, a third hazard related to the first hazard and the second hazard not previously associated with the confined space 30. For example, while the first hazard by itself might not be associated with a third hazard and the second hazard by itself might not be associated with a third hazard, confined space configuration service 68H may determine that, in combination, the first and second hazard are associated with a third hazard. For instance, confined space configuration service 68H may determine that confined space 30 is associated with a temperature hazard (e.g., high temperatures) and a particular fuel (e.g., a fuel having a relatively low flash point or a relatively low autoignition temperature), and may determine that the combination of first and second hazards is associated with a third hazard (e.g., fire).

Confined space configuration service 68H applies at least one of confined space model 74B to the one or more characteristics of confined space 30 to identify at least one hazard remediation technique for the particular confined space. Confined space configuration service 68H may determine one or more hazard remediation techniques for confined space 30 in response to determining one or more hazards associated with confined space 30. For example, confined space configuration service 68H may apply at least one of confined space models 74B to the hazards associated with confined space 30 to determine hazard remediation techniques for confined space 30. For instance, confined space configuration service 68H may apply one or more confined space models 74B to compare the hazards associated with confined space 30 to other confined spaces that are also associated with one or more similar hazards, and may determine that the hazard remediation techniques for confined space 30 include the same or similar hazard remediation techniques as confined spaces having the same or similar hazards.

In some examples, the one or more hazard remediation techniques include utilizing one or more articles of hazard remediation equipment, such as PPE (e.g., SRL 11, respirator 13, etc.) or non-PPE equipment (e.g., lights, fans, computing devices, etc.), or a combination therein. For example, confined space configuration service 68H may determine that the remediation techniques associated with confined space 30 include utilizing respirator 13 and a portable light source. Responsive to determining the one or more hazard remediation techniques, confined space configuration service 68H may update the proposed work configuration to include the one or more hazard remediation techniques.

In some examples, confined space configuration service 68H may identify a specific piece of hazard remediation equipment (e.g., PPE 62, batteries, ladder, etc.) as a hazard remediation technique. For example, confined space configuration service 68H may determine that the hazard remediation technique includes utilizing a particular type of PPE, (e.g., respirator 13). For instance, confined space configuration service 68H may identify a specific respirator of respirators 13 for use during a particular task within confined space 30. Confined space configuration service 68H may identify a specific article of PPE from a plurality of PPEs of the same time based on an estimate of the amount of time to complete the particular task. In some examples, confined space configuration service 68H may determine the estimated time to complete the task based on a time input by a user while setting up a proposed work configuration. Confined space configuration service 68H may determine the estimated time to complete the task based on confined space models 74B. For instance, confined space configuration service 68H may apply one or more models 74B to the characteristics of confined space 30 to estimate the amount of time to complete a similar task in similar confined spaces.

Confined space configuration service 68H may determine, from a group of hazard remediation equipment that are all the same type (e.g., respirators 13), a particular hazard remediation equipment for the task based on the estimated time to complete the task. For example, confined space configuration service 68H may query equipment data 74C to determine which respirator to recommend for a particular task to be completed within confined space 30. Confined space configuration service 68H may determine the status of one or more components (e.g., battery, filter, air supply) of each hazard remediation equipment (e.g., respirator 13) of the same type. For instance, equipment data 74C may indicate that a first respirator 13 has 90% battery remaining and 2% filter remaining, and that a second respirator 13 has 60% battery remaining and 75% filter remaining. Confined space configuration service 68H may identify one or more pieces of hazard remediation equipment of the same type of hazard remediation equipment having the remaining resources to operate at least the estimated time to complete the task. For example, confined space configuration service 68H may identify the first respirator has the hazard remediation technique in scenarios where the filter is not expected to be utilized in confined space 30 and the task is expected to utilize more than 60% of the battery. Similarly, confined space configuration service 68H may identify the second respirator as the hazard remediation technique in scenarios where the 50% of the filter and 50% of the battery is expected to be utilized to complete the task.

Confined space configuration service 68H may determine one or more anomalies in the proposed work configuration for confined space 30. For example, confined space configuration service 68H may apply at least one of confined space models 74B to the one or more characteristics of confined space 30 to identify anomalies in the proposed work configuration for confined space 30. In some instances, an anomaly in the proposed work configuration may include a potential hazard that is likely to be found in confined space 30 but was not previously associated with confined space 30 (e.g., not entered by a user when setting up the proposed work configuration). An anomaly may also include a potential hazard remediation technique not previously associated with confined space 30. In some examples, confined space configuration service 68H may detect an anomaly in the amount of time a user expects a given task to take and the amount of time similar tasks (e.g., in similar types of confined spaces) typically take.

In some examples, confined space configuration service 68H may recommend a hazard remediation technique based on the anomaly in the proposed work configuration. For example, confined space configuration service 68H may determine that the proposed work configuration does not include a hazard remediation technique that would be appropriate based on the characteristics of confined space 30 and one or more of confined space models 30. For instance, a user may not include a particular article of PPE in the proposed work configuration (e.g., because the user forgot to include a hazard or remediation technique, or was unaware of a particular hazard or remediation technique). Responsive to detecting an anomaly in the proposed work configuration, confined space configuration service 68 may recommend an article of PPE based on the anomaly. In other words, confined space configuration service 68H may generate an alert indicating a recommended article of PPE and/or automatically update the proposed work configuration to include the recommend article of PPE in response to detecting potential issues in the proposed work configuration.

Confined space configuration service 68H may output a notification indicating the at least one hazard remediation technique. For example, confined space configuration service 68H may output a message to one or more of computing devices 16, 18, hub 14, safety stations 15, etc. For instance, confined space configuration 68H may output for display a notification that includes one or more suggested articles of PPE and/or other equipment.

In some examples, confined space configuration service 68H may recommend one or more of workers 10 for a particular task. Confined space configuration service 68H may recommend one or more of workers 10 based on the task to be performed, an experience level of each worker of workers 10, trainings received by each worker of workers 10, or a combination therein. For instance, confined space configuration service 68H may query worker data 74D to determine which workers of workers 10 have received training on the particular task to be performed. Confined space configuration service 68H may select a worker trained to perform the particular task within a particular timeframe (e.g., the last six months). Confined space configuration service 68H may select a worker who has performed the task at least a threshold amount of times. In some scenarios, such as when the task requires at least two workers to operate in the confined space 30, confined space configuration service 68H may select an experienced worker (e.g., someone who has performed the task at least a threshold number of times) and a relatively less experienced worker.

Confined space configuration service 68H may determine one or more of workers 10 to perform the task based on exposure levels to a particular hazard. For example, confined space configuration service 68H may determine an estimated exposure level for a particular hazard that indicates a degree to which worker 10A will be exposed to the particular hazard, and may select a worker based on the estimated exposure level for the task. In some examples, confined space configuration service 68H determines the estimated exposure level by applying one or more of confined space models 74B to the estimated amount of time to complete the task. For example, confined space configuration service 68H may determine an average exposure rate for a unit of time (e.g., exposure per minute/hour/etc.) and may multiple the exposure rate by the estimated task completion time to determine the estimated exposure level for the task.

In some examples, confined space configuration service 68H may determine, based on the estimated exposure level for the task, one or more workers 10 permitted to operate in confined space 30. A worker of workers 10 may be permitted to operate in confined space 30 if the worker's respective cumulative exposure does not satisfy (e.g., is less than or equal to) a threshold exposure level. In some instances, the threshold exposure level may be user defined or based on company or government regulations (e.g., safety data sheet (SDS)). Responsive to determining the estimated exposure level, confined space configuration service 68H may predict the cumulative exposure for one or more workers (e.g., daily exposure, yearly exposure, lifetime exposure) based on previous exposure and the estimated exposure for the particular task, and may select one or more of workers 10 whose predicted cumulative exposure does not satisfy (e.g., is less than or equal to) a threshold exposure level. In other words, confined space configuration service 68H may recommend one or more of workers 10 whose respective cumulative exposure levels are less than or equal to a threshold exposure level.

In some examples, one or more of services 68 may analyze data generated by equipment (PPEs 62, sensing stations 21, etc.) within environment 8B to improve worker safety while one or more of workers 10 are working within confined space 30. For example, as discussed above, event endpoint frontend 68A may receive event streams 69 from PPE 62, hubs 14, and/or sensing stations 21. Event selector 68B directs the incoming stream of events to stream analytics service 68F, which represents an example of an analytics engine configured to perform in depth processing of the incoming stream of events to perform real-time analytics. Stream analytics service 68F may, for example, be configured to process and compare multiple streams of event data 74A with confined space models 74B in real-time as event data 74A is received. Stream analytic service 68F may be configured to detect anomalies, transform incoming event data values, trigger alerts upon detecting safety concerns, control one or more articles of PPE 62 (e.g. as a means of hazard remediation), or any combination therein. For instance, analytics service 68F may apply one or more confined space models 74B to potentially hundreds, thousands, or millions (or more) of event streams 69 to compute assertions, such as identified anomalies, predicted occurrences of imminent safety events, or hazard remediation techniques.

Analytics service 68F may configured as an active safety management system that predicts imminent safety concerns, provides real-time alerting and reporting. In addition, analytics service 68F may be a decision support system that provides techniques for processing inbound streams of event data to generate assertions in the form of statistics, conclusions, and/or recommendations on an aggregate or individualized worker and/or PPE basis for enterprises, safety officers and other remote users. For instance, analytics service 68F may apply confined space models 74B to determine, for a particular worker, the likelihood that a safety event is imminent for the worker based on detected behavior or activity patterns, environmental conditions, and geographic locations. In some examples, analytics service 68F may determine whether a worker is currently impaired, e.g., due to exhaustion, sickness or alcohol/drug use, and may require intervention to prevent safety events.

Hence, analytics service 68F may maintain or otherwise use one or more models that provide risk metrics to predict safety events. Analytics service 68F may also generate order sets, recommendations, and quality measures. In some examples, analytics service 68F may generate user interfaces based on processing information stored by CSMS 6 to provide actionable information to any of clients 63. For example, analytics service 68F may generate dashboards, alert notifications, reports and the like for output at any of clients 63. Such information may provide various insights regarding baseline ("normal") operation across worker populations, identifications of any anomalous workers engaging in abnormal activities that may potentially expose the worker to risks, identifications of any geographic regions within environments for which unusually anomalous (e.g., high) safety events have been or are predicted to occur, identifications of any of environments exhibiting anomalous occurrences of safety events relative to other environments, and the like.

According to techniques of this disclosure, analytics service 68F determine one or more hazard remediation techniques to be applied to one or more articles of PPE 62. In some examples, analytics service 68F may determine the one or more hazard remediation techniques based on one or more hazards and one or more characteristics of confined space 30.

In some scenarios, analytics service 68F may determine one or more hazards associated with confined space 30. For example, analytics service 68F may determine the one or more hazards associated with confined space 30 based on user inputs, one or more of confined space models 74B, and/or data receiving by a hazard sensor. Confined space 30 may include one or more hazard sensors (e.g., sensing stations 21) that detect one or more hazards (e.g., temperature, gases, weather, etc.) within confined space 30. Sensing stations 21 may detect different types of hazards. For instance, a first sensing station 21 located within confined space 30 may detect temperature, while a second sensing station 21 located within confined space 30 may detect one or more gases. Sensing stations 21 may send an indication of the hazard to CSMS 6, such that analytics service 68F may receive the indication of the hazards detected by one or more sensing stations 21.

For example, analytics service 68F may apply one or more of confined space models 74B to one or more hazards associated with confined space 30 and one or more characteristics of confined space 30 to determine the one or more hazard remediation techniques to be applied to an article of PPE 62. For instance, analytics service 68F may receive an indication (e.g., from sensing stations 21) that confined space 30 includes elevated concentrations of gas. Analytics service 68F may determine (e.g., by applying one or more of models 74B) a hazard remediation technique based on the characteristics (e.g., type) of the confined space and the hazard (e.g., gas), that a respirator should circulate oxygen to one or more of workers 10. In other words, in this example, analytics service 68F may determine that one hazard remediation technique includes turning on (or increasing the flow rate of) an oxygen delivery device of the respirator 13. Similarly, analytics service 68F may determine that another hazard remediation technique includes lowering a visor for a head-unit that is part of respirator 13. As another example, analytics service 68F may determine that the hazard remediation technique includes leaving confined space 30.

Analytics service 68F may determine the hazard remediation technique based at least in part on the length of time one of workers 10 has been in confined space 30. For example, analytics service 68F may log the time one of workers 10 (e.g., worker 10A) enters confined space 30 and may determine the amount of time worker 10A has been in confined space 30.

Analytics service 68F may determine an estimated amount of time (also referred to as an estimated task completion time) to complete a task within confined space 30. In other words, for a given task, analytics service 68F may estimate how much time the task to be completed within confined space 30 will take. Analytics service 68F may estimate the task completion time by applying one or more of confined space models 74B to the type of task and the type of confined space 30. For instance, analytics service 68F may compare the task and confined space to the amount of time similar tasks typically take when performed in similar confined spaces.

Analytics service 68F may determine whether at least one component (e.g., battery, air filter, air supply, etc.) of PPE 62 utilized by worker 10A will be consumed is less than the estimated task completion time. In other words, analytics service 68F may determine whether at least one component of PPE 62 will be exhausted before the task is complete. For example, analytics service 68F may determine whether an air tank of respirator 13 will run out of oxygen before worker 10A completes the task in confined space 30. For instance, analytics service 68F may determine that worker 10A is utilizing oxygen faster than normal (e.g., due to illness, higher concentrations of gas in confined space 30, etc.) and may determine that the oxygen supply will be consumed before worker 10A completes the task. In some scenarios, analytics service 68F may determine a hazard remediation technique in response to determining that at least one component of PPE 62 will be utilized in less than the estimated task completion time. For instance, analytics service 68F may determine that the hazard remediation technique includes switching to an auxiliary oxygen source.

In some examples, analytics service 68F may determine an actual exposure level for a particular hazard that indicates a degree to which worker 10A has been exposed to the particular hazard. For instance, one or more sensing stations 21 may detect sound, radiation, gas, or other hazard to which cumulative exposure may affect a worker. Sensing stations 21 may send an indication of the exposure and analytics service 68F may determine worker 10A's cumulative exposure to the hazard during the amount of time worker 10A has been in confined space 30. Analytics service 68F may determine whether the actual exposure level satisfies (e.g., is greater than or equal to) a threshold actual exposure level. For instance, the threshold actual exposure level may be an allowed actual exposure level, a certain percentage of a maximum allowed actual exposure level, etc. Analytics service 68F may determine the hazard remediation technique in response to determining that the actual exposure level satisfies the threshold actual exposure level. For example, analytics service 68F may determine that worker 10A has been exposed to at least a threshold amount of sound (e.g., at least a threshold decibel level over a sustained period of time) and may recommend a hazard remediation technique (e.g., additional hearing protection).

As another example, sensing station 21A may include one or more Wi-Fi® enabled gas monitors (e.g., which may report gas readings at defined intervals). Analytics service 68F may calculate a worker's exposure based on those readings. Additionally, sensing stations 21 may detect heat and other environmental exposures, which may be measured and reported for each worker within confined space 30. Responsive to determining that worker 10A has been exposed to at least a threshold amount of heat or other hazard, analytics service 68F may output a notification to one or more of workers 10 or attendants monitoring confined space 30. In some examples, analytics service 68F may output a notification to one or more remote users 24 (e.g., remote users 24 may monitor a plurality of confined spaces live from a control center), which may enable remote users 24 to monitor multiple confined spaces rather than having an attendant physically present at confined space 30.

Analytics service 68F may output a notification of the hazard remediation technique. In some examples, the notification may include a message indicating one of workers 10 should manually apply the hazard remediation technique to the article of PPE. In other instances, the notification may include a command that causes the article of PPE 62 to automatically apply the hazard remediation technique. For instance, when the hazard remediation technique includes changing an oxygen delivery rate (e.g., turning on the oxygen or increasing the flow rate), respirator 13 may receive the notification from analytics service 68F and may automatically adjust the oxygen delivery rate.

In some examples, analytics service 68F may receive an indication of a change in a hazard and may determine a second hazard remediation technique based on the change in the hazard. For example, sensing station 21A may detect low levels of gases when worker 10A initially enters confined space 30 and may determine the first hazard remediation technique includes setting the oxygen delivery rate of respirator 13. However, sensing station 21A may detect higher levels of gas at a later point in time. Thus, responsive to detecting a change in the hazard, analytics service 68F may determine a second hazard remediation technique (e.g., if the first hazard remediation technique is insufficient to remediate the hazard). In some examples, analytics service 68F may determine a second hazard remediation technique to apply to a different article of PPE. For example, analytics service 68F may determine that the gas concentration in confined space 30 has increased (e.g., beyond a threshold concentration) and that remediating the hazard includes removing worker 10A from confined space 30. Thus, analytics service 68F may output a notification to an article of PPE 62 (e.g., extraction equipment 23) commanding the extraction equipment 23 to remove worker 10A from confined space 30. Responsive to receiving the notification indicating the second hazard remediation technique, the extraction equipment may automatically remove worker 10A from confined space 30.

In some examples, analytics service 68F may determine whether to extract worker 10A from confined space 30. For example, analytics service 68F may determine whether it is safe to automatically extract worker 10A from confined space 30. Analytics service 68F may apply one or more of confined space models 74B to one or more characteristics of confined space 30 (e.g., type of confined space) and one or more hazards associated with confined space 30 to determine whether worker 10A may be safely extracted. For example, one or more safety models 74B may indicate combinations of confined spaces and hazards when automatic removal is safe or unsafe. For instance, in examples where confined space 30 is a railcar with baffles, analytics service 68F may determine that removing worker 10A from the railcar is unsafe (e.g., because of a potential injury due to the baffles). In another example, such as where confined space 30 is a tunnel, analytics service 68F may determine that worker 10A can be safely and automatically removed, such that analytics service 68F may command extraction equipment 23 to automatically remove worker 10A from confined space 30.

Analytics service 68F may update one or more of models 74B. For example, analytics service 68F may update the models for a particular worker, a particular population of workers, a particular environment, or combinations thereof based on data received from PPE 62. Analytics service 68F may update one or more of models 74B based on hazards detected inside and/or outside of confined space 30. For example, sensing station 21A may detect a hazard present within confined space 30 that was not previously associated with confined space 30. In some instances, analytics service 68F may determine whether to associate the new hazard with confined space 30 and/or any other confined spaces. For instance, analytics service 68F may compare the characteristics of confined space 30 to the characteristics of a plurality of other confined spaces and may update one or more of models 74B to indicate that other confined spaces that are similar to confined space 30 may also experience the new hazard.

In some examples, analytics service 68F may update one or more of models 74B based on regulations (e.g., company, industry, government, etc.). For example, CSMS 6 may obtain updated regulations (e.g., via user input, querying a datastore provided by a regulatory organization, or pushed from a regulatory organization). Responsive to obtaining the updated regulations, analytics service 68F may update one or more of models 74B based on the updated regulations.

Analytics service 68F may update one or more of models 74B based on data generated by sensors (e.g., sensing station 21B) located outside confined space 30. For example, conditions outside confined space 30 may cause, or be correlated with, certain hazards inside confined space 30. For instance, certain gases may be more likely within confined space 30 as the temperature outside confined space 30 increases.

In some examples, analytics service 68F may update one or more of models 74B. For example, analytics service 68F may determine that certain hazards are associated with certain sub-types of a particular type of confined space, certain sub-sets of geographic regions, or other characteristics. For example, when initially trained, one or more of confined space models 74B may associate a group of hazards with every confined space is a particular type of confined space. Analytics service 68F may update one or more of confined space models 74B based on data received from sensing stations 21, hubs 14, or other sensors within each confined space. For instance, analytics service 68F may determine that certain sub-types of tanks (e.g., septic tanks) are associated with a first subset of hazards and that other sub-types of tanks (e.g., food tanks) are associated with a second subset of hazards. Thus, analytics service 68F may update one or more of models 74B to more accurately predict the hazards and hazard remediation techniques associated with a given confined space. In other words, analytics service 68F may update one or more of models 74B based on the sub-type of each respective confined space of the plurality confined spaces.

Thus, analytics service 68F may identify conditions that could result in dangerous situations including injury and death to the workers. When such a situation is identified, analytics service 68F may automatically send an alert to the appropriate emergency response team. In some examples, analytics service 68F may send an alert to an attendant or worker (e.g., worker 10B) outside the tank. By monitoring confined space 30 in real-time, analytics service 68F may proactively identify harmful and life-threatening situations before a person is injured or killed.

Figure 3:
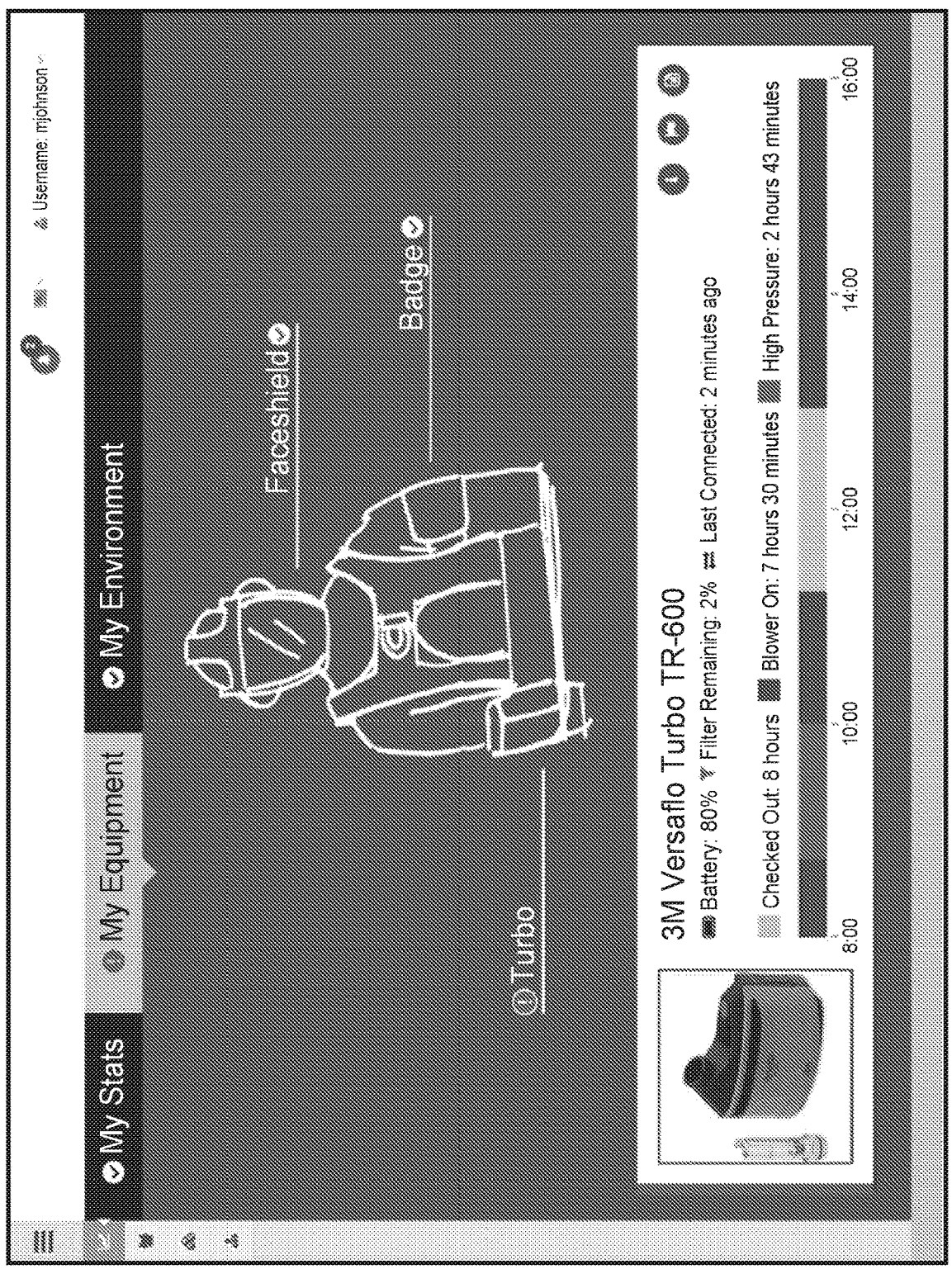
FIG. 3 illustrates an example user interface for recommending an article of PPE as a hazard remediation technique, according to aspects of this disclosure.

FIG. 3 illustrates an example user interface for recommending an article of PPE as a hazard remediation technique, according to aspects of this disclosure. For example, CSMS 6 may determine the hazard remediation techniques based at least in part on the status and/or usage of one or more articles of PPE. For example, as illustrated in FIG. 3, CSMS 6 may determine the status of various components (e.g., battery, filter, etc.) of a particular respirator 13. CSMS 6 may recommend a specific respirator 13 (or other PPE) of a plurality of respirators 13 based on a status of one or more components of a specific respirator 13. For example, CSMS 6 may estimate the amount of time to complete a task in confined space 30 and may determine that the hazard remediation technique includes using a specific respirator of respirator 13 having enough remaining resources in each of the components (e.g., battery, air supply, etc.) to operate for estimated amount of time. Thus, CSMS 6 may recommend a specific respirator for completing the task based on the status of one or more components of the specific respirator 13.

Figure 4:
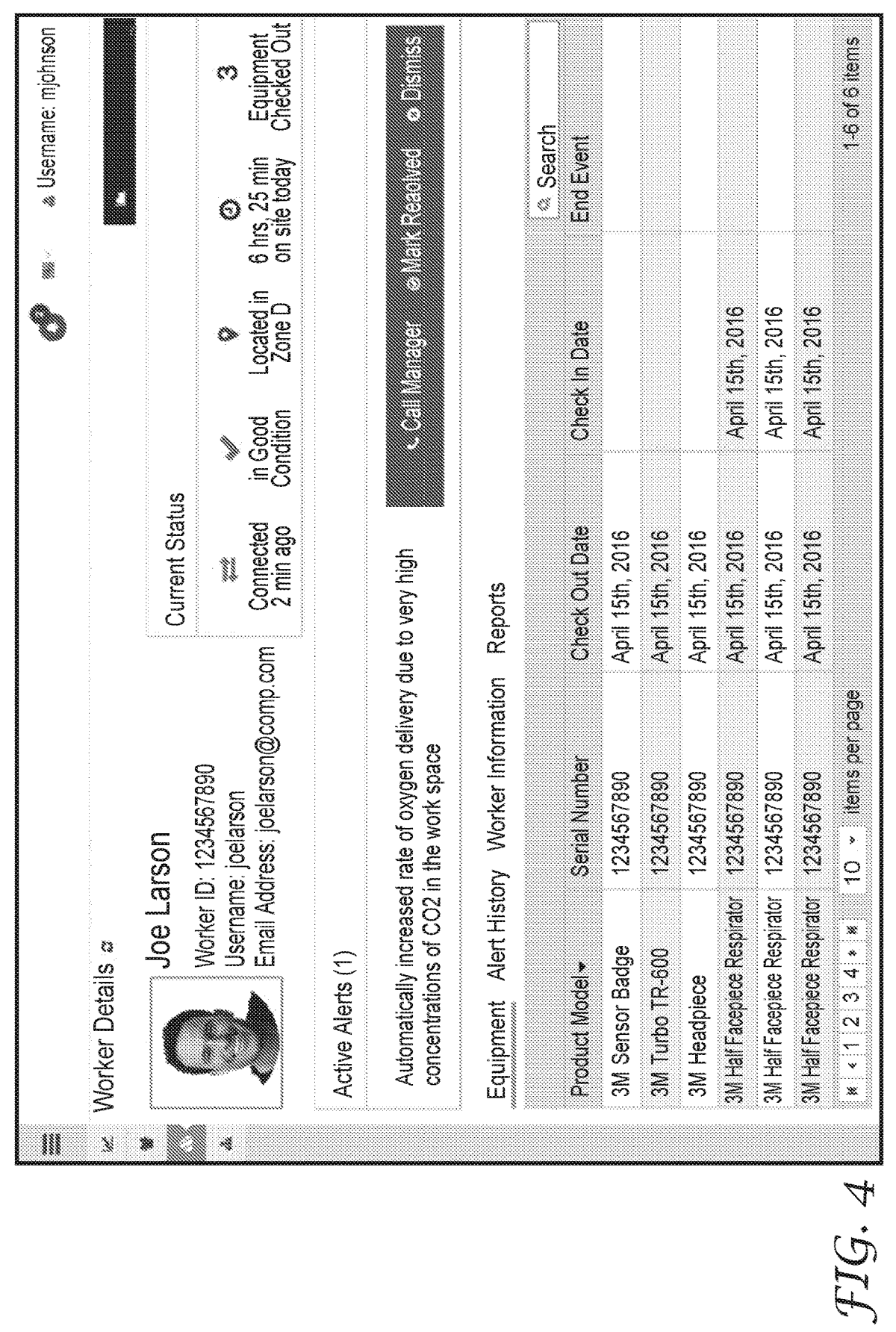

FIG. 4 illustrates an example user interface for monitoring hazard remediation techniques applied by an article of PPE, according to aspects of this disclosure. CSMS 6 may determine one or more hazard remediation techniques while a worker is operating in confined space 30. CSMS 6 may automatically apply a hazard remediation technique to a particular article of PPE. For instance, as illustrated in FIG. 4, CSMS 6 may automatically increase the rate of oxygen delivered by respirator 13 and may generate a report indicating the application of the hazard remediation technique.

That is, users 24 or software executing on computing devices 16, 18, (FIG. 1) may submit queries to CSMS 6 and receive data corresponding to the queries for presentation in the form of one or more reports or dashboards. The UIs shown in FIGS. 10-13 represent examples of such reports or dashboards, and may be output, for example, at any of computing devices 60 (FIG. 2).

Figure 5:
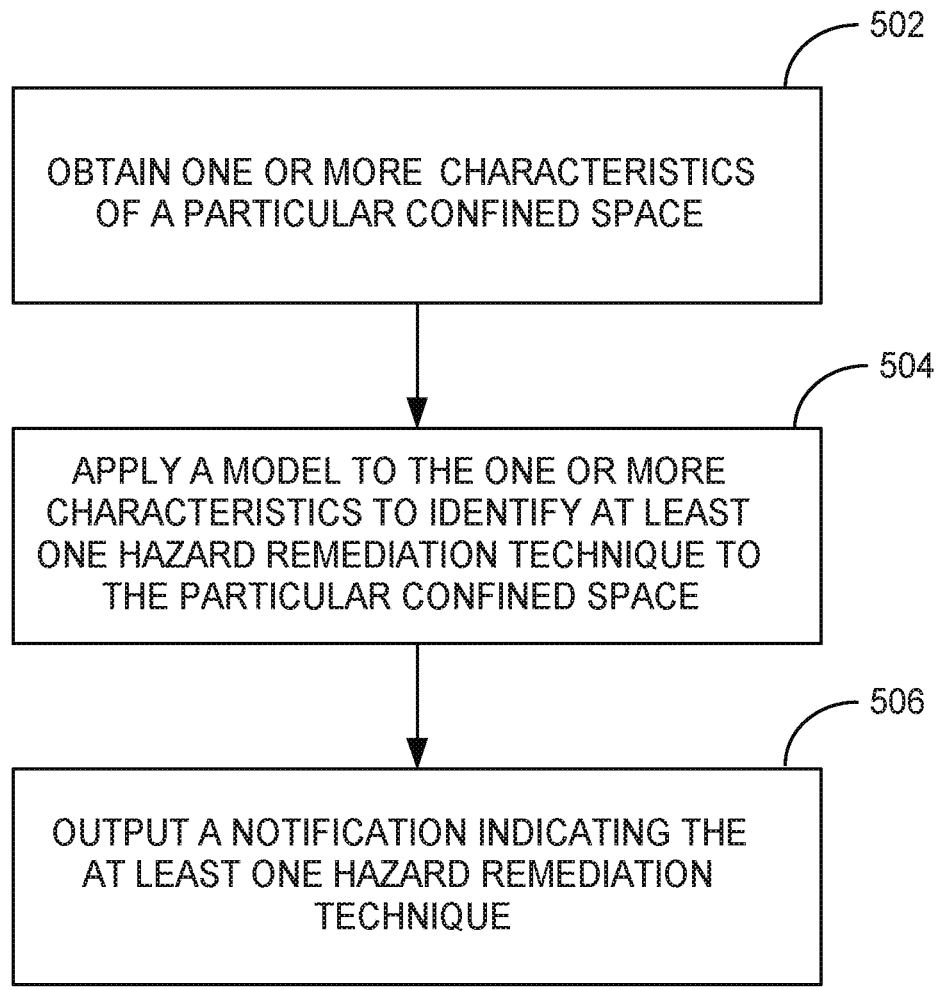
FIG. 5 is a flow diagram illustrating an example process for identifying a hazard remediation technique, according to aspects of this disclosure.

FIG. 5 is a flow diagram illustrating an example process for identifying a hazard remediation technique, according to aspects of this disclosure. While the techniques shown in FIG. 5 are described with respect to CSMS 6, it should be understood that the techniques may be performed by a variety of computing devices, such as SRLs 11, respirators 13, head protection 22, and/or hubs 14.

CSMS 6 may obtain one or more characteristics of a particular confined space (e.g., confined space 30) having limited means of entry or exit (502). In some examples, the one or more characteristics of confined space identifying at least a type of confined space 30. For example, CSMS 6 may receive an indication of user input setting up a proposed work configuration identifying confined space 30 as either a new or existing confine space. The user input may include information about one or more characteristics of confined space 30, such as the type of confined space (e.g., tank, manhole, stairwell, shaft, etc.) and/or a type of task to be performed within confined space 30. In some scenarios, the user input indicates additional characteristics of confined space 30, such as the size of confined space 30, location of confined space 30, hazards associated with confined space 30, etc. In some instances, CSMS 6 may obtain one or more characteristics of confined space 30 from a memory device. For instance, CSMS 6 may receive an indication that confined space 30 is the particular confined space to be worked in, and may retrieve information about the characteristics of confined space 30 from the memory device.

CSMS 6 may apply at least one model (e.g., one or more of confined space models 74B) to the one or more characteristics of the confined space 30 to identify at least one hazard remediation technique for confined space 30 (504). In some examples, the one or more characteristics include at least one hazard associated with confined space 30. CSMS 6 may identify the at least one hazard based on a user input and/or application of a model. For instance, CSMS 6 may receive an indication (e.g., when a user sets up the proposed work configuration) of one or more hazards associated with (e.g., known to exist within) confined space 30. In some examples, CSMS 6 may determine one or more hazards associated with confined space 30 by applying one or more models to the characteristics of confined space 30. For example, CSMS 6 may compare the characteristics of confined space 30 to the characteristics of a plurality of other confined spaces. CSMS 6 may determine that confined space 30 is similar to at least one of the plurality of confined spaces that has similar characteristics, and may determine that confined space 30 is associated with one or more hazards of the at least one similar confined space.

In some examples, CSMS 6 applies the at least one model to identify at least one hazard remediation technique in response to determining one or more hazards associated with confined space 30. For example, CSMS 6 may compare the characteristics of confined space 30 (e.g., type, location, hazards, etc.) to the characteristics of a plurality of other confined spaces. In some instances, CSMS 6 may identify one or more confined spaces that are a same or similar type as confined space 30. In such instances, CSMS 6 may identify the hazard remediation techniques for confined space 30 based on the hazard remediation techniques associated with the confined spaces of the same or similar type. For instance, CSMS 6 may determine that the hazard remediation techniques for confined space 30 include any hazard remediation techniques associated with each of the same (or similar) type of confined space. In other words, if confined space 30 is a tank, and a plurality of other tanks are associated with a temperature hazard, CSMS 6 may identify temperature as a hazards associated with confined space 30. Additionally or alternative, in some examples, CSMS 6 identifies the at least one hazard remediation techniques based on characteristics such as location, hazards, etc.

CSMS 6 may output a notification indicating the at least one hazard remediation technique (506). For example, CSMS 6 may output the notification to one or more of computing device 60, clients 63, or any other computing device. For instance, CSMS 6 may output for display a work configuration that identifies the hazard remediation techniques (e.g., articles of PPE and/or other safety equipment) for completing the task. One or more workers 10 may view the work configuration and utilize the identified articles of PPE and/or safety equipment when performing a task within confined space 30.

In some examples, CSMS 6 may output the notification indicating the at least one hazard remediation technique to an article of PPE. The article of PPE may receive the notification and may apply the hazard remediation technique. For example, the notification may include a command to alter operation of the article of PPE and the article of PPE may alter operation of the article of PPE according to the command. For instance, if the notification indicates that at least one hazard remediation technique is to alter an oxygen delivery rate, respirator 13 may receive a command from CSMS 6 and may alter the oxygen delivery rate.

Figure 6:
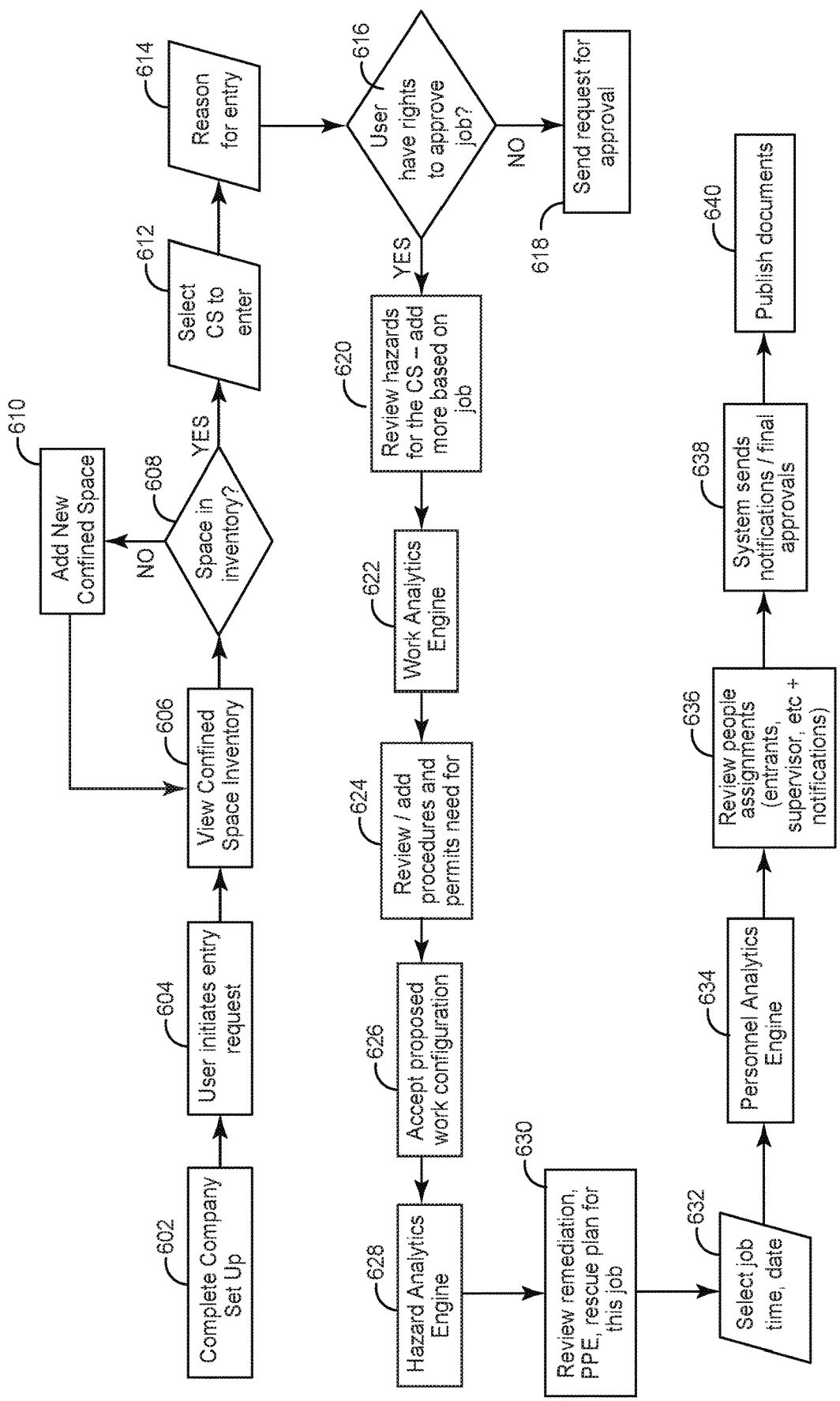
FIG. 6 is a block diagram illustrating an operating perspective of the worker protection equipment management system shown in FIG. 1.

FIG. 6 is a block diagram illustrating an operating perspective of the worker protection equipment management system shown in FIG. 1. While the techniques shown in FIG. 5 are described with respect to CSMS 6, it should be understood that the techniques may be performed by a variety of computing devices, such as SRLs 11, respirators 13, head protection 22, and/or hubs 14.

CSMS 6 may receive a user input to configure CSMS 6 with information corresponding to a company or client (602). For instance, CSMS 6 may include information corresponding to one or more companies that operate one or more confined spaces, that work within confined spaces, or both. CSMS 6 may receive a request to enter a confined space (604). For example, a user may enter a proposed work configuration via one or more of computing device 16, 18 to perform a task within a confined space 30. CSMS 6 query a datastore to identify a group of confined spaces that are already included in the confined space inventory (e.g. confined space inventory 74E) (606). For example, CSMS 6 may enable a user to select an existing confined space from inventory or to add a new confined space to the inventory. For instance, CSMS 6 may output a graphical user interface that includes a group of pre-existing confined spaces and an option to create a new confined space.

CSMS 6 may determine whether the confined space for which the user requests entry (e.g., confined space 30) is part of the existing inventory (608). CSMS 6 may determine that a user has requested entry into a new confined space when a user selects the option to create a new confined space via the graphical interface. Responsive to determining that confined space 30 is not in the datastore of CSMS 6 ("NO" branch of 610), CSMS 6 may add confined space 30 to the inventory (610). CSMS 6 may determine that a user has requested entry into an existing confined space when a user selects a pre-existing confined space from the graphical interface. Responsive to determining that confined space 30 is in the datastore of CSMS 6 ("YES" branch of 610), CSMS 6 may select confined space 30 (612) and may add confined space 30 to a proposed work configuration for confined space 30.

CSMS 6 may also receive indications of the reasons for entering confined space 30 (e.g., which task, also referred to as a job, is to be performed in confined space 30) (614). For instance, CSMS 6 may enable a user to select from a group of pre-populated reasons for entry, such as scheduled inspection (e.g. annual inspection), electrical work, machine maintenance, and other types of work that the user enters into the system.

CSMS 6 may determine whether a user has the proper rights or authority to approve the request to enter confined space 30 (616). For instance, only certain employees (e.g., supervisors, managers, etc.) may have the ability to approve a request to enter a confined space. Responsive to determining that the user does not have the right to approve the entry request ("NO" branch of 616), CSMS 6 may send a request for approval (618) Responsive to determining that the user has the proper authority ("YES" branch of 616), output an initial group of hazards associated with confined space 30 (620). CSMS 6 may enable a user to enter additional hazards.

CSMS 6 may include a work analytics engine 622. As described in more detail with reference to FIG. 7, work analytics engine 622 may compare one or more characteristics of confined space 30 to characteristics of other confined spaces in the inventory to identify similar confined spaces. In some examples, work analytics engine 622 of CSMS 6 may identify similar spaces based on a confined space type and/or work being done in the space (e.g. a task to be performed). Work analytics engine 622 may determine one or more hazards associated with confined space 30 (e.g., based on identifying related confined spaces). Work analytics engine 622 may output a proposed work configuration. The proposed work configuration may include information such as permits needed to complete the work, procedures related to hazard remediation, and hazards associated with confined space 30 (e.g., hazards that might have been accidentally omitted from the input list of hazards).

CSMS 6 enable a user to review the proposed work configuration (624). For example, CSMS 6 may output the proposed work configuration for display and may enable the user to review and/or add hazards, procedures, and permits for the job or task to be performed within confined space 30.

Responsive to a user accepting the proposed work configuration (626), hazard analytics engine 628 (described in more detail with reference to FIG. 8) may identify one or more hazard remediation techniques for confined space 30. For example, hazards analytics engine 628 may suggest hazard remediation techniques such as equipment that should be used before and during the confined space entry (e.g., one or more articles of PPE or other safety equipment). Hazard analytics engine 628 may determine the one or more hazard remediation techniques based at least in part on one or more characteristics of confined space 30, such as confined space type, entry location and size, anchorage point information, permit type, and approximate time to complete the job (e.g., remediation time and entry time). In this way, hazard analytics engine 628 may recommend remediation equipment and processes as well as PPE to increase worker safety in confined space 30. Additionally, the hazard remediation techniques recommended by hazards analytics engine 628 may include the quantity of equipment to complete the task (e.g., based on the approximate or estimated amount of time this entire process will take). For example, when an estimated task completion time is a long time (e.g., greater than or equal to a threshold amount of time), hazard analytics engine 628 may recommend additional equipment such as an additional battery packs or respirator cartridges. In some examples, CSMS 6 may update hazard analytics engine 628 (e.g., using machine learning) based on analysis of historical data.

Work analytics engine 628 may output a notification indicating one or more hazard remediation techniques. For example, work analytics engine 628 may output the notification for display at one or more of computers 16, 18. In other words, work analytics engine 628 may output the proposed work configuration, which may identify confined space 30 as a confined space to be worked in, one or more tasks to be completed in confined space 30, remediation techniques, rescue plans, etc. A user may review the proposed work configuration (630) and may select a date and/or time for performing the job or task (632).

Personnel analytics engine 634, which is described in more detail with reference to FIG. 9, may determine one or more workers 10 to perform the task within confined space 30. Personnel analytics engine 634 may receive inputs such as the remediation techniques (e.g., articles of PPE and/or other safety equipment), procedures, permits, type of confined space entry (e.g., based on clustering), estimated task completion time, etc. Personnel analytics engine 634 may determine one or more workers 10 to perform one or more tasks within confined space 30 based on worker experience, trainings, availability of workers 10, the estimated task completion time, etc.

Personnel analytics engine 634 may detect anomalies in the estimated task completion time. For example, personnel analytics engine 634 may determine whether the timings of the jobs (e.g., the estimated task completion time) are in line with previous similar jobs. Personnel analytics engine 634 may suggest an estimated task completion time period. In some examples, personnel analytics engine 634 may output an indication of previously completed tasks that support the suggestion. Additionally, there may be portions of the work that have to be completed at certain times or within a single shift. For example, personnel analytics engine 634 may increase productivity by suggesting days or times when the work should be performed, which may minimize machine down time and reduce the cost of the work (e.g., because fewer equipment and people would be needed to perform the work).

Personnel analytics engine 634 may output (e.g., for display) an indication of workers assigned to perform a task within confined space 30, an estimated amount of time, a scheduled date/time, etc. A user may review the assignments and schedule (636). Responsive to receiving an indication that the proposed work configuration has been approved, CSMS 6 may output a notification indicating the proposed work configuration has been approved (638). The notification may include information indicating the confined space, schedule, personnel, task, hazards, hazard remediation techniques, etc. CSMS 6 may publish documents (640) associated with confined space 30. For instance, CSMS 6 may output the approved work configuration, checklists, manuals, etc. to assist workers 10 in preparing for entry to confined space 30.

Figure 7:
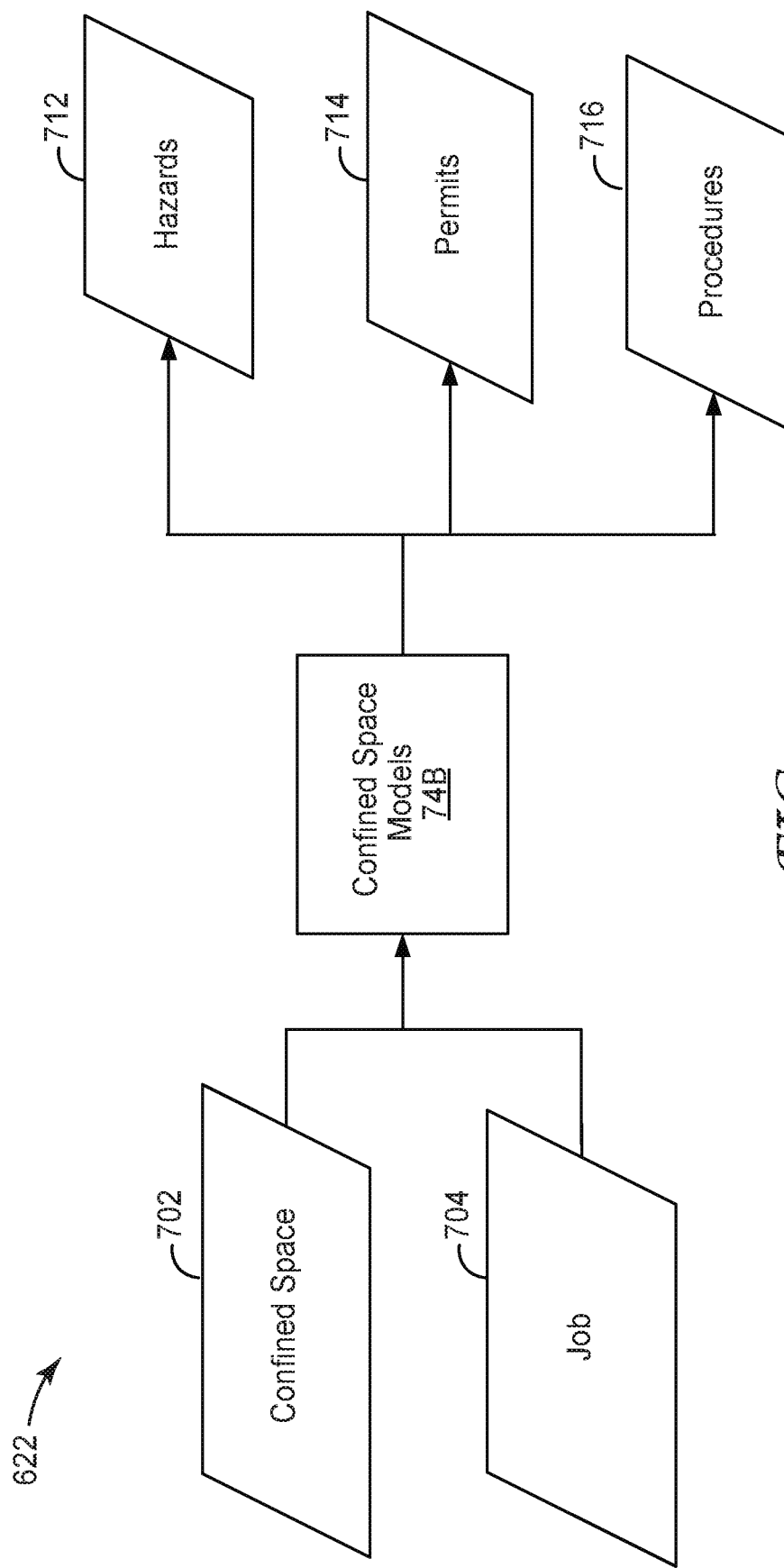
FIG. 7 is a block diagram illustrating an operating perspective of the worker protection equipment management system shown in FIG. 1.

FIG. 7 is a block diagram illustrating an operating perspective of the worker protection equipment management system shown in FIG. 1. While the techniques shown in FIG. 5 are described with respect to work analytics engine 622 of CSMS 6, it should be understood that the techniques may be performed by a variety of computing devices, such as SRLs 11, respirators 13, head protection 22, and/or hubs 14. In some examples, work analytics engine 622 may correspond to, and may include all or part of the functionality of, confined space configuration service 68H and/or analytics service 68F, as described with reference to FIG. 2.

In general, in some examples, work analytics engine 622 determines one or more hazards associated with a particular confined space (e.g., confined space 30). Work analytics engine 622 may also determine permits needed to perform a particular task, procedures utilized when performing the particular task, or both. In some examples, work analytics engine 622 determines the hazards, permits, and/or procedures based on the characteristics of confined space 30 (e.g., type of confined space, location, hazards previously associated with confined space 30, etc), information about a task to be performed, or both. For instance, work analytics engine 622 may apply one or more of confined space models 74B to the characteristics of confined space 30 and the job or task to be performed. In other words, in some examples, the inputs to one or more confined space models 74B may include an indication of the confined space 702 and the job/task 704 to be performed.

In some examples, work analytics engine 622 applies one or more of confined space models 74B by comparing confined space 30 and the task to be performed within confined space 30 to historical data for other confined spaces and tasks. In other words, work analytics engine 622 may determine hazards, permits, and/or procedures for the current task to be performed in confined space 30 based on information about similar tasks performed in similar confined spaces. In some instances, work analytics engine 622 may apply a clustering algorithm to determine the types of permits associated with the task to be performed. In other words, the outputs of the one or more confined space models 74B may include an indication of hazards 712, permits 714, and/or procedures 716 associated with the task to be performed in confined space 30.

In some scenarios, if hazard_a, hazard_b and hazard_c are associated with multiple other vaults and the user adds a new vault confined space to the system, work analytics engine 622 may suggest that these hazards are associated with the new vault confined space. Similarly, after sufficient data has been collected about jobs being performed during confined space entries, work analytics engine 622 may offer suggested hazards to consider for the job that will be performed.

Figure 8:
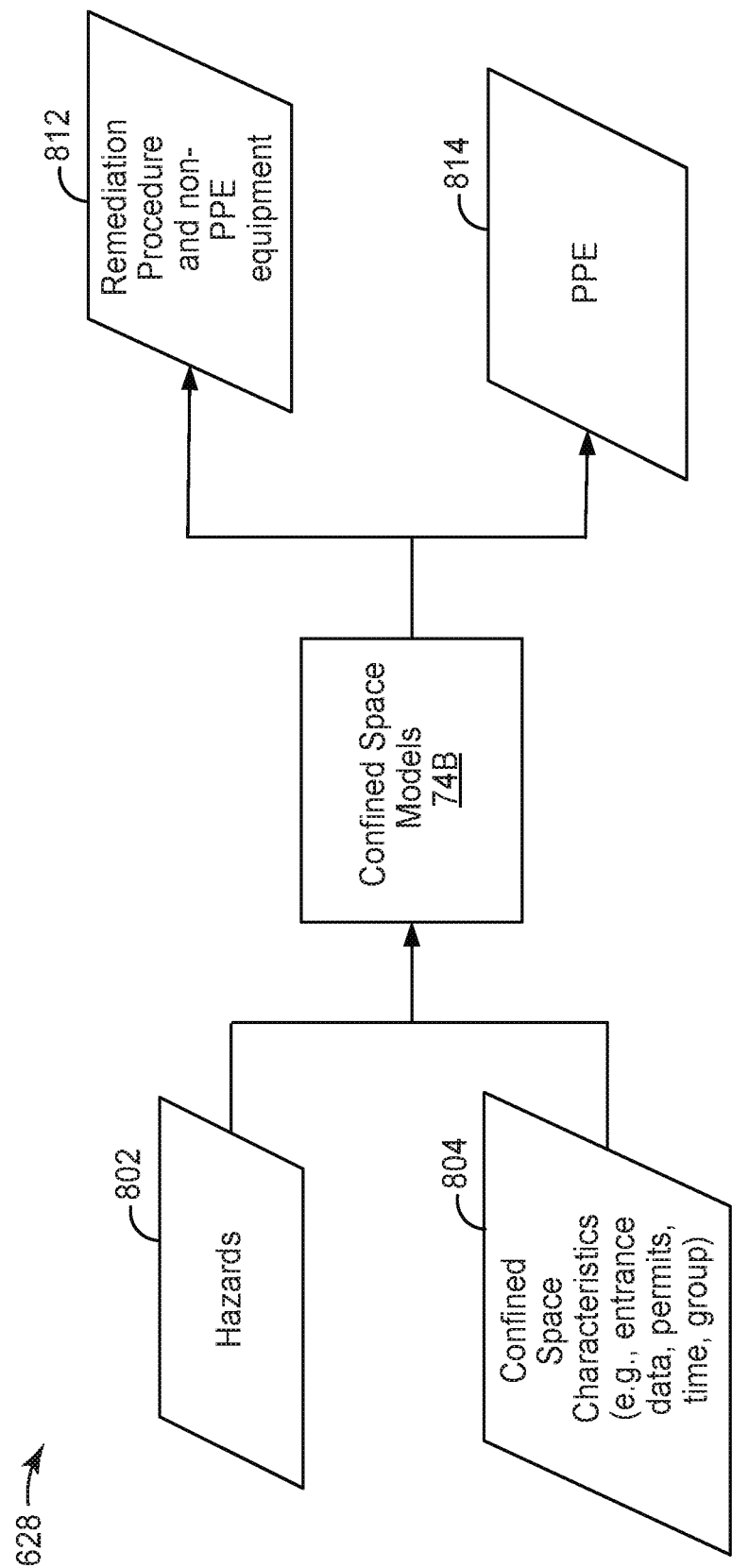
FIG. 8 is a block diagram illustrating an operating perspective of the worker protection equipment management system shown in FIG. 1.

FIG. 8 is a block diagram illustrating an operating perspective of the worker protection equipment management system shown in FIG. 1. While the techniques shown in FIG. 5 are described with respect to hazard analytics engine 628 of CSMS 6, it should be understood that the techniques may be performed by a variety of computing devices, such as SRLs 11, respirators 13, head protection 22, and/or hubs 14. In some examples, hazard analytics engine 628 may correspond to, and may include all or part of the functionality of confined space configuration service 68H and/or analytics service 68F, as described with reference to FIG. 2.

Hazard analytics engine 628 may receive information about the characteristics of confined space 30 and may determine one or more hazard remediation techniques. The characteristics may include hazards associated with confined space 30, location of confined space 30, dimensions of confined space 30, etc. Hazard analytics engine 628 may apply one or more confined space models 74B to the characteristics of confined space 30 to determine the one or more hazard remediation techniques. For instance, hazard analytics engine 628 may compare historical data for similar tasks performed in similar confined spaces as the task to be performed in confined space 30 in order to determine hazard remediation techniques. In other words, inputs to confined space models 74B may include hazards 802 and/or characteristics of a confined space 804.

Hazard analytics engine 628 may determine hazard remediation techniques based on the task to be completed, estimated completion time, permits, etc. The hazard remediation techniques may include one or more articles of PPE, articles of safety equipment, and/or procedures to implement. In other words, outputs from one or more of confined space models 74B may include hazard remediation techniques, such as hazard remediation procedures and non-PPE equipment 812, and PPE equipment 814. In some examples, hazard analytics engine 628 may detect anomalies in a proposed work configuration (e.g., hazard remediation techniques not previously identified) and may update the proposed work configuration based on the anomalies.

In other words, once the hazards have been identified for the job to be performed in the particular space, the hazard analytics engine 628 may offer suggested hazard/risk remediation techniques (e.g., Lock Out Tag Out (LOTO)), ventilation and/or Personal Protective Equipment (PPE) that should be worn. Further, hazard analytics engine 628 may identify multiple hazards and consider the interactions between hazards and other external factors such as weather to suggest remediation techniques.

Figure 9:
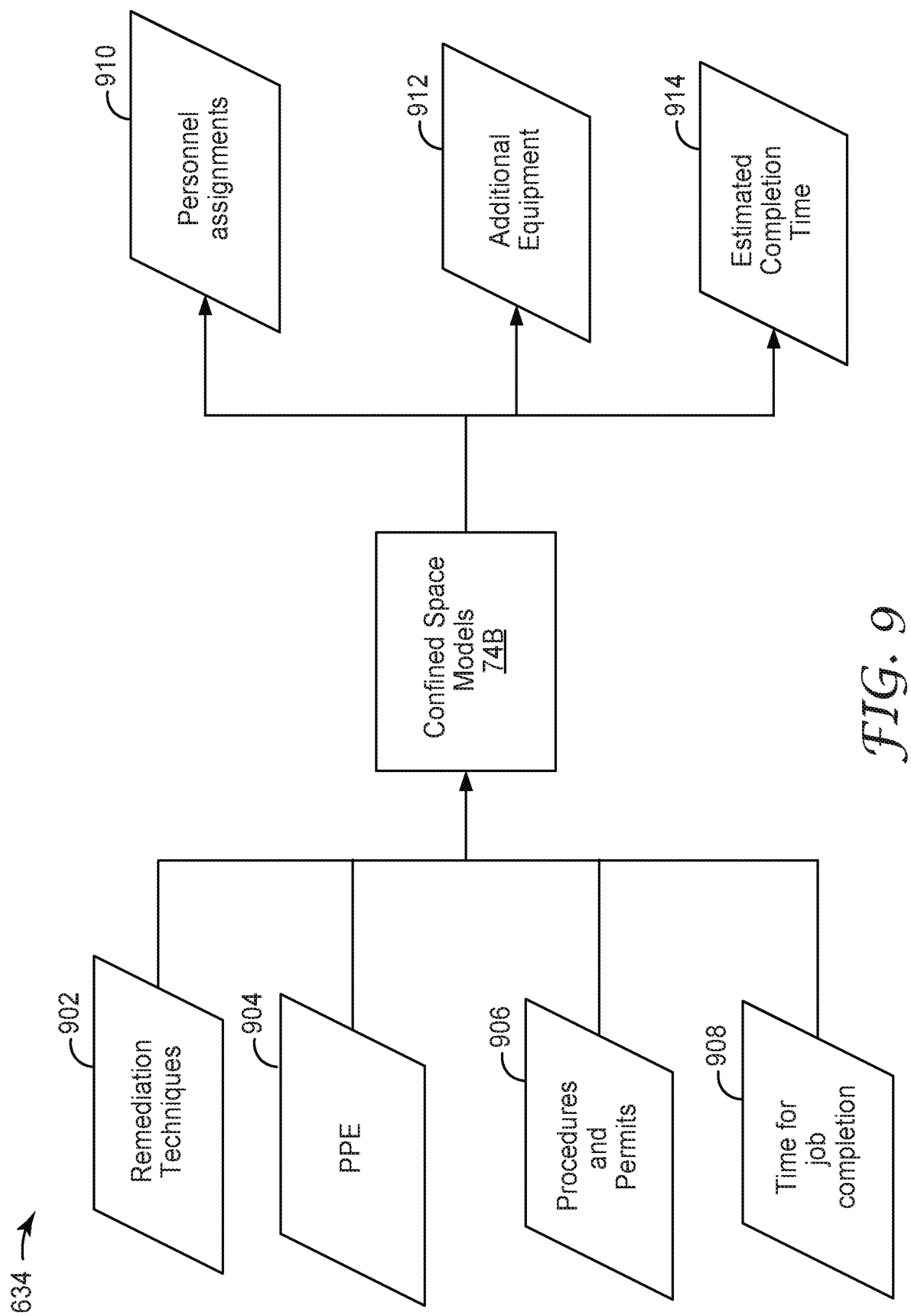
FIG. 9 is a block diagram illustrating an operating perspective of the worker protection equipment management system shown in FIG. 1.

FIG. 9 is a block diagram illustrating an operating perspective of the worker protection equipment management system shown in FIG. 1. While the techniques shown in FIG. 5 are described with respect to personnel analytics engine 634 of CSMS 6, it should be understood that the techniques may be performed by a variety of computing devices, such as SRLs 11, respirators 13, head protection 22, and/or hubs 14. In some examples, personnel analytics engine 634 may correspond to, and may include all or part of the functionality of, confined space configuration service 68H and/or analytics service 68F, as described with reference to FIG. 2.

Personnel analytics engine 634 may receive information about a task to be performed within confined space 30, such as procedures, permits, an estimated task completion time, hazards, hazard remediation techniques, etc. Personnel analytics engine 634 may apply one or more of confined space models 74B to such information and may output personnel recommendations, equipment recommendations, and/or an estimated task completion time based on the application of the confined space models 74B. In other words, inputs to one or more confined space models 74B may include one or more remediation techniques 902, one or more articles of PPE 904, one or more procedures and/or permits 906, a time for job completion 908. Outputs of the one or more confined space models 74B may include personnel assignments 910, additional equipment 912, and an estimated task completion time 914. For instance, personnel analytics engine 634 may identify personnel with experience and/or training performing similar tasks in similar confined spaces as the particular task to be completed within confined space 30. Similarly, personnel analytics engine 634 may estimate the task completion time based on how long it has taken to workers 10 to complete similar tasks in similar confined spaces.

In other words, personnel analytics engine 634 may recommend personnel for a particular task and/or confined space (e.g., after the hazards and remediation techniques and equipment have been identified). In some instances, personnel analytics engine may learn who is commonly assigned to certain confined spaces or jobs and recommend those people. In some examples, personnel analytics engine 634 may recommend personnel based on experience or training. For example, personnel analytics engine 634 may recommend only welders for a welding job.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:
    an article of personal protective equipment (PPE);
    a plurality of articles of hazard remediation equipment;
    one or more sensors configured to provide sensor data associated with the plurality of articles of hazard remediation equipment; and
    a computing system comprising:
        a repository storing at least one model for a plurality of confined spaces each having limited means of entry or exit, the at least one model based at least in part on respective sets of one or more characteristics of the plurality of confined spaces; and
        a computing device configured to:
            receive user input setting up a work configuration for the system, wherein the user input includes one or more characteristics of a particular confined space having limited means of entry or exit, the one or more characteristics of the particular confined space identifying at least a type of the particular confined space;
            receive an indication of a task to be performed within the particular confined space;
            apply the at least one model to the one or more characteristics of the particular confined space to identify at least one hazard remediation technique, the at least one hazard remediation technique comprising a particular hazard remediation equipment among the plurality of articles of hazard remediation equipment to be used with the article of PPE within the particular confined space, wherein the computing device is configured to apply the at least one model to the one or more characteristics of the particular confined space by at least being configured to:
                determine an estimated amount of time to complete the task to be performed in the particular confined space;
                determine, based on the sensor data associated with the plurality of hazard remediation equipment, a status of one or more of the plurality of articles of hazard remediation equipment that are the same type; and
                determine, based on the status of each of the plurality of articles of hazard remediation equipment, the particular article of hazard remediation equipment, wherein the particular article of hazard remediation equipment includes remaining resources to operate for at least the estimated amount of time to complete the task to be performed in the particular confined space, wherein the particular article of hazard remediation equipment comprises a respirator and the remaining resources include sufficient battery life and sufficient oxygen to operate for the estimated amount of time to complete the task to be performed in the particular confined space; and
            output a notification indicating the at least one hazard remediation technique that includes an indication of the particular article of hazard remediation equipment that includes remaining resources to operate for at least the estimated amount of time to complete the task to be performed in the particular confined space.

2. The system of claim 1, wherein the computing device is further configured to:
    determine, by application of the at least one model to the one or more characteristics of the particular confined space, an anomaly in a proposed work configuration for the particular confined space.

3. The system of claim 2, wherein identification of the at least one hazard remediation techniques comprises identification of the article of PPE based on the anomaly.

4. The system of claim 1, wherein the application of the at least one model to the one or more characteristics of the particular confined space comprises comparison of at least one of the respective sets of one or more characteristics of at least one of the plurality of confined spaces with the one or more characteristics of the particular confined space.

5. The system of claim 4, wherein application of the at least one model to the one or more characteristics of the particular confined space comprises identification of one or more of the plurality of confined spaces having a same type as the type of the particular confined space.

6. The system of claim 1, wherein the computing device is further configured to:
    identify, based on a first hazard associated with the particular confined space and a second hazard associated with the particular confined space, a third hazard related to the first hazard and the second hazard that is not associated with the particular confined space, wherein the computing device is further configured to identify the hazard remediation technique based on the third hazard, wherein the hazard remediation technique includes a recommended article of PPE.

7. The system of claim 1, wherein the one or more characteristics of the particular confined space indicates one or more hazards associated with the particular confined space, wherein application of the at least one model to the one or more characteristics of the particular confined space comprises identification of at least additional one hazard not previously associated with the particular confined space.

8. The system of claim 1, wherein the computing device is configured to apply the at least one model to the one or more characteristics of the particular confined space by at least being further configured to:

determine, based on the status of one or more components of each of the plurality of articles of hazard remediation equipment, the at least one particular article of hazard remediation equipment having a second component with remaining resources to operate at least the estimated amount of time.

9. The system of claim 1, wherein the computing device is further configured to:

determine, based at least in part on one or more characteristics of the plurality of confined space, a sub-type of each confined space of the plurality of confined spaces, and update, based on the sub-type of each confined space of the plurality of confined spaces, the model.

10. The system of claim 1, wherein the article of PPE is a first article of PPE and wherein the article of PPE is a particular type of PPE, the system further comprising:

a plurality of articles of PPE that are the particular type of PPE, the plurality of articles of PPE including the first article of PPE and a second article of PPE, wherein the computing device is configured to determine the at least one particular article of hazard remediation equipment as the at least one hazard remediation technique by at least being configured to:

determine, based on sensor data, a status of one or more components of the first article of PPE, the one or more components of the first article of PPE including the first component;

determine, based on sensor data, a status of one or more components of the second article of PPE, the one or more components of the second article of PPE including a second component of the same type as the first component;

select, from the first article of PPE and the second article of PPE, based on the status of first component of the one or more components of the first article of PPE and the status of the second component of the one or more components of the second article of PPE, the first article of PPE as the at least one hazard remediation technique.

11. A method comprising:

receiving, by a computing device, user input setting up a work configuration, wherein the user input includes one or more characteristics of a particular confined space having limited means of entry or exit, the one or more characteristics of the particular confined space identifying at least a type of the particular confined space;

receiving an indication of a task to be performed within the particular confined space;

receiving, from one or more sensors associated with a plurality of articles of hazard remediation equipment, sensor data associated with the plurality of articles of hazard remediation equipment;

applying, by the computing device, at least one model to the one or more characteristics of the particular confined space to identify at least one hazard remediation technique for the particular confined space, the at least one model based at least in part on respective sets of one or more characteristics of the plurality of confined spaces, wherein applying the at least one model to the one or more characteristics of the particular confined space at least includes:

determining an estimated amount of time to complete the task to be performed in the particular confined space;

determining, based on the sensor data associated with the plurality of hazard remediation equipment that are the same type, a status of the plurality of articles of hazard remediation equipment that are the same type; and determining, based on the status of each of the plurality of articles of hazard remediation equipment, at least one particular article of hazard remediation equipment with remaining resources to operate for at least the estimated amount of time to complete the task to be performed in the particular confined space, wherein the particular article of hazard remediation equipment comprises a respirator and the remaining resources include sufficient battery life and sufficient oxygen to operate for the estimated amount of time to complete the task to be performed in the particular confined space; and outputting, by the computing device, a notification indicating the at least one hazard remediation technique that includes an indication of the particular article of hazard remediation equipment that includes remaining resources to operate for at least the estimated amount of time to complete the task to be performed in the particular confined space.

12. The method of claim 11, further comprising:

determining, by application of the at least one model to the one or more characteristics of the particular confined space, an anomaly in a proposed work configuration for the particular confined space.

13. The method of claim 12, wherein identifying the at least one hazard remediation technique includes recommending a PPE of the at least one particular article of hazard remediation equipment based on the anomaly.

14. The method of claim 11, wherein applying the at least one model to the one or more characteristics of the particular confined space comprises comparing at least one of the respective sets of one or more characteristics of at least one of the plurality of confined spaces with the one or more characteristics of the particular confined space.

15. The method of claim 14, wherein applying the at least one model to the one or more characteristics of the particular confined space comprises identifying one or more of the plurality of confined spaces having a same type as the type of the particular confined space.

16. The method of claim 11, further comprising:

identifying, based on a first hazard associated with the particular confined space and a second hazard associated with the particular confined space, a third hazard related to the first hazard and the second hazard that is not associated with the particular confined space, wherein applying the at least one model comprises identifying the hazard remediation technique based on the third hazard, wherein the hazard remediation technique includes a recommended article of PPE.

17. The method of claim 11, wherein the one or more characteristics of the particular confined space indicates one or more hazards associated with the particular confined space, wherein applying the at least one model to the one or more characteristics of the particular confined space comprises identifying at least additional one hazard not previously associated with the particular confined space.

18. The method of claim 11, wherein applying the at least one model to the one or more characteristics of the particular confined space at least further includes:
determining, based the status of one or more components of each of the plurality of articles of hazard remediation equipment, the at least one particular article of hazard remediation equipment having a second component with remaining resources to operate at least the estimated amount of time.

19. The method of claim 11, further comprising:
determining, by the computing device, based at least in part on one or more characteristics of the plurality of confined space, a sub-type of each confined space of the plurality of confined spaces, and
updating, by the computing device, based on the sub-type of each confined space of the plurality of confined spaces, the model.

20. The method of claim 11, further comprising:
determining, by the computing device, an estimated exposure level indicating a degree to which a worker will be exposed to a particular hazard while in the particular confined space; and
determining, by the computing device, based on the estimated exposure level, from a plurality of workers, a particular worker permitted operate in the particular confined space.

* * * * *